(12) United States Patent
Inoue

(10) Patent No.: US 7,887,064 B2
(45) Date of Patent: Feb. 15, 2011

(54) SUSPENSION SYSTEM FOR VEHICLE

(75) Inventor: Hirofumi Inoue, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 120 days.

(21) Appl. No.: 12/445,235

(22) PCT Filed: Aug. 28, 2007

(86) PCT No.: PCT/JP2007/066599

§ 371 (c)(1),
(2), (4) Date: Apr. 10, 2009

(87) PCT Pub. No.: WO2008/044395

PCT Pub. Date: Apr. 17, 2008

(65) Prior Publication Data

US 2010/0032912 A1 Feb. 11, 2010

(30) Foreign Application Priority Data

Oct. 13, 2006 (JP) .............................. 2006-279856

(51) Int. Cl.
*B60G 17/015* (2006.01)
(52) U.S. Cl. .................. 280/5.5; 280/5.502; 280/5.506; 280/5.507; 280/5.513
(58) Field of Classification Search ............... 280/5.502, 280/5.505, 5.506, 5.507, 5.513
See application file for complete search history.

(56) References Cited

U.S. PATENT DOCUMENTS

| | | | | |
|---|---|---|---|---|
| 5,060,959 A | | 10/1991 | Davis et al. | |
| 5,062,658 A | * | 11/1991 | Majeed | 280/5.503 |
| 5,096,219 A | * | 3/1992 | Hanson et al. | 280/5.508 |
| 5,098,119 A | * | 3/1992 | Williams et al. | 280/5.507 |
| 5,291,406 A | * | 3/1994 | Williams et al. | 701/37 |
| 5,398,184 A | * | 3/1995 | Yamaoka et al. | 701/82 |
| 5,839,082 A | * | 11/1998 | Iwasaki | 701/38 |
| 6,295,493 B1 | * | 9/2001 | Kawazoe | 701/38 |
| 6,389,341 B1 | * | 5/2002 | Davis | 701/37 |
| 7,735,837 B2 | * | 6/2010 | Barth et al. | 280/5.502 |
| 2002/0089128 A1 | | 7/2002 | Charaudeau et al. | |
| 2005/0179219 A1 | * | 8/2005 | Barron | 280/5.506 |

(Continued)

FOREIGN PATENT DOCUMENTS

JP 02 193704 7/1990

(Continued)

*Primary Examiner*—Toan C To
(74) *Attorney, Agent, or Firm*—Oblon, Spivak, McClelland, Maier & Neustadt, L.L.P.

(57) ABSTRACT

In a system in which an actuator force to be generated by an actuator is controlled based on a component sum that is a sum of a vibration damping component as the actuator force to be generated in a vibration damping control and a posture control component that is the actuator force to be generated in a body-posture control, a control in which the posture control component is limited so as to be not larger than a limit value is executable. The system ensures the actuator force that should be generated in the vibration damping control by limiting the posture control component, in a situation in which there is a limit in the actuator force that can be generated. Accordingly, a sufficient amount of a damping force can be generated, so that riding comfort of the vehicle and the like is prevented from being deteriorated.

24 Claims, 13 Drawing Sheets

U.S. PATENT DOCUMENTS

2009/0121444 A1 * 5/2009 Bushko et al. .......... 280/5.507

FOREIGN PATENT DOCUMENTS

| | | |
|---|---|---|
| JP | 3 63402 | 6/1991 |
| JP | 2503240 | 6/1996 |
| JP | 2001 311452 | 11/2001 |
| JP | 2003 042224 | 2/2003 |
| JP | 2003 104025 | 4/2003 |
| WO | WO 02/08001 A1 | 1/2002 |

* cited by examiner (a) VIBRATION DAMPING COMPONENT (b) POSTURE CONTROL COMPONENT (c) TARGET ACTUATOR FORCE

SUSPENSION SYSTEM FOR VEHICLE

TECHNICAL FIELD

The present invention relates to a suspension system including an electromagnetic actuator configured to apply, to a sprung portion and an unsprung portion, a force in a direction in which the sprung portion and the unsprung portion are moved toward and away from each other.

BACKGROUND ART

In recent years, there has been developed, as a suspension system for a vehicle, the so-called electromagnetic suspension system including an electromagnetic actuator configured to apply, to a sprung portion and an unsprung portion, a force in a direction in which the sprung portion and the unsprung portion are moved toward and away from each other. For instance, the following Patent Documents disclose such an electromagnetic suspension system. Each of the disclosed suspension systems is expected as a high-performance suspension system in view of an advantage that it is possible to easily realize a suspension characteristic based on the so-called skyhook theory.

Patent Document 1 JP-A-2003-104025
Patent Document 2 JP-A-2003-42224

DISCLOSURE OF THE INVENTION

(A) Summary of the Invention

In each of the electromagnetic suspension systems disclosed in the above-indicated Patent Documents, there are simultaneously executable, by controlling the actuator, a vibration damping control for damping vibrations of the vehicle and a body-posture control for controlling a posture of a body of the vehicle by restraining roll and pitch of the vehicle. There exists, however, a limit in an amount of an actuator force that can be generated by the actuator, due to restrictions on and limitations to an electrifying current amount of an electric motor of the actuator and a supply current amount from an electric power source to the electric motor. Accordingly, where the vibration damping control and the body-posture control are simultaneously executed, there may arise a situation in which the actuator force becomes insufficient. The insufficiency in the actuator force leads to a deterioration in the riding comfort as felt by vehicle passengers and a deterioration in the steerability and the stability of the vehicle.

The electromagnetic suspension system is still under development and suffers from various problems in addition to the above-indicated problem of the insufficiency of the actuator force. Accordingly, there is plenty of room for modification to improve the utility of the suspension system. The present invention has been made in view of the problem described above. It is therefore an object of the invention to provide a suspension system having a high degree of utility.

To achieve the object indicated above, a suspension system for a vehicle according to the present invention is configured to control an actuator force generated by an actuator based on a component sum of (A) a vibration damping component that is the actuator force to be generated in a vibration damping control and (B) a posture control component that is the actuator force to be generated in a body-posture control, and is configured to limit the posture control component to a value not larger than a limit value.

In the suspension system according to the invention, even in a situation in which there is a limit in the actuator force that can be generated, it is possible to ensure the actuator force that should be generated in the vibration damping control by limiting the posture control component, whereby a sufficient damping force is generated for thereby preventing the riding comfort of the vehicle, etc., from being deteriorated. Owing to such an advantage, the present suspension system has a high degree of utility.

(B) Forms of Invention

There will be explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of the various forms and preferred embodiments. It is to be further understood that any form in which one or more elements is/are added to or deleted from any one of the following forms may be considered as one form of the claimable invention.

(1) A suspension system for a vehicle, comprising:
a suspension spring disposed between a sprung portion and an unsprung portion;
an electromagnetic actuator which is disposed in parallel with the suspension spring and which includes an electric motor, the actuator applying, to the sprung portion and the unsprung portion, an actuator force that is a force in a direction in which the sprung portion and the unsprung portion are moved toward and away from each other, based on a force generated by the electric motor; and
a control device which controls the actuator and which is configured to execute simultaneously (a) a vibration damping control in which the actuator force is generated as a vibration damping force for damping at least a sprung vibration and (b) a body-posture control in which the actuator force is applied as a body-posture control force for restraining at least one of roll and pitch of a body of the vehicle,
wherein the control device is configured to control the actuator force generated by the actuator, based on a component sum which is a sum of (A) a vibration damping component that is the actuator force to be generated in the vibration damping control and (B) a posture control component that is the actuator force to be generated in the body-posture control, and the control device includes a posture-control-component limiting portion (206) configured to limit the posture control component to a value not larger than a posture-control-component limit value that is a limit value of the posture control component.

There exists a limit in the actuator force that can be generated by the actuator, due to restrictions on and limitations to an electrifying current amount which is an amount of the current flowing through the motor, a supply current amount which is an amount of the current supplied from an electric power source, and the like. More specifically, a sufficient amount of the actuator force cannot be generated in an instance where a limitation is imposed on the electrifying current amount for preventing the motor from suffering from an excessive load such as abnormal heat generation in coils of the motor, and in an instance where a limitation is imposed on the supply current amount due to an increase in the internal resistance of a battery, for instance. Where the vibration damping control and the body-posture control are simultaneously executed under those limitations, the actuator force is insufficient when a sum of the actuator force required in the vibration damping control and the actuator force required in the body-posture control becomes large. In such a case, the control of the actuator is unsatisfactory, resulting in a deterioration in the riding comfort of the vehicle, a deterioration in the steerability and the stability of the vehicle, etc.

In the meantime, the body-posture control is for restraining or suppressing roll and pitch of the vehicle body for the purpose of improving the steerability and the stability of the vehicle. Accordingly, even if the actuator force to be generated in the body-posture control becomes insufficient, the amount of the actuator force that enables the roll and the pitch of the vehicle to be restrained is merely decreased to a certain extent, and therefore an influence on the riding comfort of the vehicle and so on can be considered to be relatively small. In contrast, the vibration damping control is for damping vibrations generated in the vehicle. Accordingly, if the actuator force to be generated in the vibration damping control is insufficient, the vibrations of the vehicle cannot be sufficiently damped. In other words, the insufficiency of the actuator force in the vibration damping control may give a large influence on the riding comfort of the vehicle and the like, as compared with the insufficiency of the actuator force in the body-posture control.

In the above form (1), the actuator force to be generated in the body-posture control is limited for giving a higher priority to the vibration damping control over the body-posture control. According to the form, the actuator force in the vibration damping control can be sufficiently ensured. Therefore, the form effectively avoids or prevents a deterioration in the riding comfort of the vehicle.

As the "suspension spring" described in the form (1), there may be employed various springs including a coil spring and a hydraulic spring such as an air spring. The type of the "electric motor" as a power source of the electromagnetic actuator may not be particularly limited, but may be suitably selected from among various types including a brushless DC motor. In terms of the manner of the movement of the motor, the motor may be a rotary motor or a linear motor. The suspension system according to the above form may be equipped with a "drive circuit" for driving the motor. As the drive circuit, the so-called inverter may be employed. The inverter may be configured to drive the motor by an operation of its switching elements and is desirably configured to execute a pulse width modulation (PWM) control.

The actuator force in the above form (1) is generated based on a force to be generated by the electric motor (hereinafter referred to as "motor force"). The motor force is not necessarily limited to a force that is generated by an electric power supplied from an electric power source to the electric motor. More specifically, the motor force in an instance where the sprung portion and the unsprung portion are positively moved toward and away from each other and the motor force in a state not accompanied by the movement of the sprung portion and the unsprung portion toward and away from each other depend on the electric power supplied from the electric power source. However, the motor force functioning as a resistance against the movement when the sprung portion and the unsprung portion are moved toward and away from each other does not necessarily depend on the electric power supplied from the electric power source. That is, in some instances, the motor force may be a force that depends on an electromotive force generated in the motor, namely, a force when the motor functions as an electricity generator.

In general, the electric motor is driven at a constant voltage. In this instance, the force generated by the electric motor may be considered to be generally proportional to an "electrifying current amount" that is an amount of the electric current which flows in the motor. Accordingly, the electric motor is preferably controlled in the system according to the above form (1) by controlling the electrifying current amount, and there may be preferably employed, as the above-described drive circuit, one configured to control the electrifying current amount. Where the above-indicated electromotive force of the motor is taken into consideration, the electrifying current amount described above depends on: a "supply current amount" that is an amount of the electric power to be supplied from the electric power source to the motor; and an amount of the electric current that the electric motor when functioning as the electricity generator can generate, more strictly, a "generated current amount" or "electric current amount that can be generated" that is an amount of the electric current in an instance where electrifying terminals of the motor are short-circuited. In short, the electrifying current amount may be considered generally as a sum of the supply current amount and the generated current amount. Accordingly, the control of the electrifying current amount may be considered as the control of the generated current amount. It is noted that the supply current amount means, in a strict sense, not only the current amount supplied from the electric power source to the electric motor, but also an amount of the current that is generated by the electric motor and regenerated to the electric power source, namely, an amount of the so-called regenerated current. Accordingly, the drive circuit, the electric power source, etc., is preferably configured to regenerate the current that is generated by the electric motor.

The control of the actuator according to the above form (1) is performed based on the component sum that is a sum of the vibration damping component and the posture control component. In brief, the actuator can be controlled such that the actuator force to be actually generated becomes equal to the component sum. In the actual control, however, the actuator force per se may not be a control target, but some related amount indicative of the magnitude of the actuator force to be generated, namely, some physical amount on which the actuator force depends, may be the control target. For instance, the motor force, the electrifying current amount or a duty ratio in the pulse width modulation (PWM) control may be the control target. Further, the vibration damping component, the posture control component, and the component sum may indicate the motor force, the electrifying current amount, or the duty ratio.

As the "vibration damping control" executed in the system according to the form (1), it may be possible to employ a control based on the so-called skyhook theory in which is generated a damping force with respect to only a vibration of the sprung portion (i.e., sprung vibration). Further, it may be possible to employ a control in which is generated a damping force with respect to the sprung vibration and a vibration of the unsprung portion (i.e., unsprung vibration). Moreover, it may be possible to employ a control in which is generated a damping force with respect to a relative vibration of the sprung portion and the unsprung portion, namely, a control in which is generated a damping force similar to that in a conventional hydraulic shock absorber (that may be called "a hydraulic damper"). The system according to the form (1) may be configured to additionally execute a height changing control in which the actuator force is generated as a height-change force for changing the height of the vehicle. In this instance, the height-change force in the height changing control may be considered as one sort of the above-indicated body-posture control force or may be considered as a force different from the body-posture control force. In the former case, the height-change force as the posture control component is limited. In the latter case, the height-change force is not limited. In the latter case, the actuator force may be controlled, for instance, on the basis of a sum of: the component sum that is a sum of the vibration damping component and the posture control component; and a height-change component that is the actuator force to be generated in the height changing control.

(2) The suspension system according to the form (1), wherein the posture-control-component limit value is set based on an electrifying current amount that is an amount of a current which flows in the electric motor.

The above form (2) limits a factor to be taken into account when the posture-control-component limit value is set. The "electrifying current amount" described in the form is proportional to the motor force and the actuator force, and may be considered to be proportional to a load on coils constituting phases of the electric motor, namely, a load on the motor. Accordingly, the form (2) may be performed such that the posture control component is limited while taking account of the motor force, the load on the electric motor and the like. To be more specific, the form may be performed such that the posture-control-component limit value is set based on an electrifying current amount at which the motor force reaches the limit or such that the posture-control-component limit value is set based on an electrifying current amount at which the load on the motor is not excessively large. The electrifying current amount based on which the posture-control-component limit value is set may be directly measured or may be estimated based on other measured physical amounts such as the supply current amount and the generated current amount, the actuator force to be used in the control or its component, or the like. Further, the electrifying current amount based on which the posture-control-component limit value is set may be a value at a present time point or a value from which can be expected the electrifying current amount that is required at the present time point, such as a previous value, or an average value or a maximum value within a prescribed preceding time counted from the present time point.

(3) The suspension system according to the form (1) or (2), wherein the posture-control-component limit value is set based on a supply current amount that is an amount of a current which is supplied from an electric power source to the electric motor.

The above form (3) limits a factor to be taken into account when the posture-control-component limit value is set. The "supply current amount" described in the form may be considered to indicate a load on the electric power source, for instance. Accordingly, the form can be performed such that the posture control component is limited while taking account of the load on the electric power source. To be more specific, the form may be performed such that the posture-control-component limit value is set based on a maximum supply current amount that the electric power source can supply or such that the posture-control-component limit value is set based on an upper-limit supply current amount within a range in which is assured stable power supply. The supply current amount based on which the posture-control-component limit value is set may be directly measured or may be estimated based on other measured physical amounts such as the electrifying current amount and the generated current amount, the actuator force to be used in the control or its component, or the like. Further, the supply current amount based on which the posture-control-component limit value is set may be a value at a present time point or a value from which can be expected the supply current amount that is required at the present time point, such as a previous value, or an average value or a maximum value within a prescribed preceding time counted from the present time point.

As described above, in the body-posture control, the actuator force is generated in a state substantially not accompanied by the movement of the sprung portion and the unsprung portion toward and away from each other. Accordingly, the posture control component can be considered to be proportional to the supply current amount. On the other hand, the electrifying current amount can be considered to be a sum of the supply current amount and the generated current amount as explained above. Accordingly, where the electrifying current amount that can flow in the motor is made large with respect to the supply current amount that is for generating the actuator force corresponding to the posture-control-component limit value (hereinafter referred to as "limit supply current amount" where appropriate), the current can flow in the motor beyond the limit supply current amount. In more detail, even when the current corresponding to the limit supply current amount is flowing in the electric motor, the current generated based on the electromotive force generated in the motor can further flow in the motor. Accordingly, if the electric motor whose electrifying current amount has a high upper limit is employed and the posture control component is limited based on the supply current amount, it is possible to generate the actuator force that depends on the electrifying current amount exceeding the supply current amount. That is, it is possible to execute the vibration damping control by the actuator force that depends on the electromotive force with the posture control component limited while taking account of the capacity of the electric power source, thus enabling the body-posture control and the vibration damping control to be simultaneously executed with high efficiency.

(4) The suspension system according to any one of the forms (1)-(3), wherein the posture-control-component limiting portion is configured to change the posture-control-component limit value.

According to the form (4), the posture-control-component limit value can be changed so as to have an appropriate magnitude in accordance with running conditions of the vehicle such as degrees of roughness and unevenness of the road surface on which the vehicle runs and the running speed of the vehicle. Accordingly, the form enables the performance of the body-posture control to be exhibited to a maximum extent while giving a higher priority to the vibration damping control. The form may be configured such that the posture-control-component limit value is continuously changed or changed in steps. Further, the form may be configured such that the posture-control-component limit value is changed based on a certain parameter and the posture-control-component limit value is changed to another value when the parameter exceeds a preset threshold.

(5) The suspension system according to the form (4), wherein the posture-control-component limiting portion is configured to change the posture-control-component limit value based on the vibration damping component to be generated.

In the above form (5), the posture-control-component limit value is changed considering to what extent the damping force to be generated needs to have a magnitude in a situation under which the vehicle is presently placed. The "vibration damping component to be generated" described in the form (5) is not limited to one directly obtained from a command value or the like that is determined in the vibration damping control. For instance, the form (5) includes an arrangement in which the unevenness of the road surface is observed and the posture-control-component limiting portion changes the posture-control-component limit value based on the vibration damping component that is estimated on the observation. Further, the form (5) may employ an arrangement in which the magnitude of the damping force needed at the present time point is judged based on the vibration damping component within a prescribed time and the posture-control-component limit value is changed based on the judgment. More specifically, the form (5) may be arranged to change the posture-control-component limit value on the basis of a maximum value, an effective value (an MS value, a root-mean-square value) or the like, of the vibration damping component within a prescribed preceding time counted from the present time point.

(6) The suspension system according to the form (5), wherein the posture-control-component limiting portion is configured to decrease the posture-control-component limit value in an instance where the vibration damping component to be generated is large, as compared with an instance where the vibration damping component to be generated is small.

In the above form (6), the limit value is made smaller by increasing the degree of limitation, in an instance where the vibration damping component to be generated is large. The form (6) ensures a sufficient amount of the actuator force necessary for the vibration damping control. The form (6) may employ an arrangement in which the limit value is changed into a value smaller than a value in a usual state, in an instance where the vibration damping component to be generated becomes large exceeding a certain threshold or an arrangement in which the limit value is made smaller with an increase in the vibration damping component to be generated.

(7) The suspension system according to any one of the forms (4)-(6), wherein the posture-control-component limiting portion is configured to change the posture-control-component limit value based on an intensity of the sprung vibration.

(8) The suspension system according to the form (7), wherein the posture-control-component limiting portion is configured to decrease the posture-control-component limit value in an instance where the intensity of the sprung vibration is high, as compared with an instance where the intensity of the sprung vibration is low.

In the above forms (7) and (8), the situation under which the vehicle is presently placed is judged from the vibration occurring in the vehicle body, for instance, and the posture-control-component limit value is changed on the basis of the judgment. The "intensity of the sprung vibration" described in the above two forms can be judged from acceleration of the sprung portion (i.e., sprung acceleration), a speed of the sprung portion (i.e., sprung speed), an amplitude of the sprung vibration, and so on, and the degree of change of each of those can be judged by known means. Further, the intensity of the sprung vibration is not necessarily judged from a current value of each of the sprung acceleration, sprung speed, and the amplitude of the sprung vibration, but may be judged from a previous value within a prescribed preceding time counted from the present time point. In the latter form (8), the limit value is made small by increasing the degree of limitation under a situation in which the intensity of the sprung vibration is high, whereby the actuator force necessary for the vibration damping control can be sufficiently ensured. In this respect, the vibration damping component that should be generated is estimated to be large under the situation in which the intensity of the sprung vibration is high. Therefore, the above two forms may be considered as one arrangement of the above-described form in which the posture-control-component limit value is changed based on the vibration damping component to be generated.

(9) The suspension system according to any one of the forms (4)-(8), wherein the posture-control-component limiting portion is configured to change the posture-control-component limit value based on an actual supply current amount that is an amount of a current which is actually supplied from an electric power source to the electric motor.

(10) The suspension system according to the form (9), wherein the posture-control-component limiting portion is configured to decrease the posture-control-component limit value in an instance where the actual supply current amount is large, as compared with an instance where the actual supply current amount is small.

In the above two forms (9) and (10), the present vehicle situation is judged from the actual supply current amount. In the above two forms, the actual supply current amount based on which the posture-control-component limit value is set is not limited to a current amount directly detected by a sensor and the like, but may be a value estimated on the basis of: an actual electrifying current amount that is a current amount which actually flows in the electric motor; and the above-indicated generated current amount. Like the above-indicated intensity of the sprung vibration, the actual supply current amount is not limited to a value at the present time point, but may be a previous value within a prescribed preceding time counted from the present time point.

In an instance where the actuator force that should be generated in the vibration damping control is large, for instance, the supply current amount is required also in the vibration damping control and there may be a risk that the actual supply current amount required as a whole exceeds the current amount that can be supplied from the electric power source. In such a case, the posture-control-component limit value is preferably made small by increasing the degree of limitation of the supply current amount in the body-posture control. In other words, the latter form (10) is effective in the case indicated above, and the actuator force to be generated in the vibration damping control can be sufficiently ensured by ensuring the supply current amount required in the vibration damping control. The latter form (10) may employ an arrangement in which the posture-control-component limit value is made smaller in a situation in which the actual supply current amount is not smaller than a preset threshold, as compared with a situation in which the actual supply current amount is less than the threshold.

(11) The suspension system according to the form (9) or (10), wherein the actuator is configured such that an operational position of the electric motor corresponds to a position in accordance with a sprung-unsprung distance that is a distance between the sprung portion and the unsprung portion, wherein the suspension system further comprises an operational-position sensor for detecting the operational position of the electric motor and an electrifying-current sensor for measuring an actual electrifying current amount that is an amount of a current which actually flows in the electric motor, and wherein the posture-control-component limiting portion is configured to estimate the actual supply current amount based on: a generated current amount of the electric motor estimated based on a result of detection by the operational-position sensor; and the actual electrifying current amount measured by the electrifying-current sensor.

(12) The suspension system according to the form (9) or (10), wherein the actuator is configured such that an operational position of the electric motor corresponds to a position in accordance with a sprung-unsprung distance that is a distance between the sprung portion and the unsprung portion, wherein the suspension system further comprises a sprung-unsprung-distance sensor for measuring the sprung-unsprung distance, and wherein the posture-control-component limiting portion is configured to estimate, based on the component sum, an actual electrifying current amount that is an amount of a current which actually flows in the electric motor and is configured to estimate the actual supply current amount based on: the estimated actual electrifying current amount; and a generated current amount of the electric motor estimated based on a result of detection by the sprung-unsprung-distance sensor.

In the above two forms (11) and (12), the actual supply current amount is estimated utilizing sensors required in the ordinary control of the actuator. The above two forms do not additionally require a sensor exclusively for detecting the actual supply current amount, thereby preventing the system from being complicated. Where the present suspension system is equipped with the drive circuit for driving the electric motor and is configured such that a signal relating to the operational position of the electric motor detected by the operational-position sensor and a signal relating to the electrifying current detected by the electrifying-current sensor are sent to the drive circuit and such that the electric motor is driven by being controlled, based on the signals, in accordance with the component sum from the control device, the latter form (12) is effective. In more detail, where the actual supply current amount is estimated on the basis of the results of detection by the operational-position sensor and the electrifying-current sensor as described in the former form (11), the results of detection by the operational-position sensor and the electrifying-current sensor need to be sent from the drive circuit to the control device, so that bidirectional communication between the control device and the drive circuit is necessary. In the latter form (12), however, communication in only one direction from the control device to the drive circuit is necessary. That is, where the system is equipped with the drive circuit described above, the system is more simplified in the latter form than in the former form. It is noted that the generated amount of the electric motor can be considered to be proportional to a relative displacement speed of the sprung portion and the unsprung portion (i.e., a sprung-unsprung relative displacement speed). Accordingly, when the generated current amount is estimated in the latter form, the sprung-unsprung relative displacement speed is initially calculated from the result of detection by the sprung-unsprung-distance sensor, and the generated current amount is determined by calculation or by referring to map data, on the basis of the calculated sprung-unsprung relative displacement speed.

(13) The suspension system according to any one of the forms (1)-(12), wherein the control device further includes a component-sum limiting portion configured to limit the component sum to a value not larger than a component-sum limit value that is a limit value of the component sum.

(14) The suspension system according to the form (13), wherein the component-sum limit value is set so as to be larger than the posture-control-component limit value.

The "component-sum limit value" described in the above two forms (13) and (14) may be set based on the electrifying current amount or may be set based on the supply current amount. Where the component sum is limited based on the electrifying current amount as in the former case, it is possible to prevent the motor from receiving an excessively large load. Where the component sum is limited based on the supply current amount in the latter case, it is possible to execute a control that takes account of the performance of the electric power source and the like.

(15) The suspension system according to any one of the forms (1)-(14), wherein the vibration damping control is for generating the actuator force in accordance with at least a sprung speed.

In the above form (15), a limitation is added to the vibration damping control. The above form permits an appropriate damping force to be generated.

(16) The suspension system according to any one of the forms (1)-(15), wherein the body-posture control is for restraining at least the roll of the body of the vehicle that arises from turning of the vehicle.

(17) The suspension system according to the form (16), wherein the body-posture control is for generating the actuator force in accordance with roll moment that acts on the body of the vehicle arising from turning of the vehicle.

In the above two forms (16) and (17), the control for restraining the roll of the vehicle body is specifically limited. The latter form (17) may be performed such that the roll of the vehicle body is restrained by a feedforward control. As a value indicative of the roll moment in the latter form, lateral acceleration generated in the vehicle body, yaw rate and the like may be employed, for instance.

(18) The suspension system according to any one of the forms (1)-(17), wherein the body-posture control is for restraining at least the pitch of the body of the vehicle arising from acceleration and deceleration of the vehicle.

(19) The suspension system according to the form (18), wherein the body-posture control is for generating the actuator force in accordance with pitch moment that acts on the body of the vehicle arising from acceleration and deceleration of the vehicle.

In the above two forms (18) and (19), the control for restraining the pitch of the vehicle body is specifically limited. The latter form (19) may be performed such that the pitch of the vehicle body is restrained by a feedforward control. As a value indicative of the pitch moment in the latter form, longitudinal acceleration generated in the vehicle body may be employed, for instance.

(20) The suspension system according to any one of the forms (1)-(19), further comprising a drive circuit disposed between the electric motor and an electric power source and configured to drive the electric motor while controlling an electrifying current amount that is an amount of a current which flows in the electric motor, by a command from the control device that is based on the component sum.

As the "drive circuit" described in the above form (20), an inverter or the like may be employed. According to the form, operations of switching elements such as FETs provided for each phase are controlled, whereby the electric motor can be driven while being controlled easily and accurately.

(21) The suspension system according to the form (20), wherein the drive circuit is configured to regenerate at least a part of an electric power generated by the electric motor to an electric power source.

According to the above form (21), the electromagnetic suspension system that assures lowered power consumption can be realized.

(22) The suspension system according to any one of the forms (1)-(21), wherein the actuator includes an external thread portion disposed on one of the sprung portion and the unsprung portion and an internal thread portion screwed with the external thread portion and disposed on the other of the sprung portion and the unsprung portion, the external thread portion and the internal thread portion rotating relative to each other in accordance with a movement of the sprung portion and the unsprung portion toward and away from each other, and wherein the force generated by the electric motor works as a force for rotating the external thread portion and the internal thread portion relative to each other.

In the above from (22), the electromagnetic actuator is limited to one that employs the so-called screw mechanism. Where the screw mechanism is employed, the electromagnetic actuator can be easily constructed. In the above form, it is arbitrarily determined on which one of the sprung portion and the unsprung portion the external thread portion is provided and on which one of the sprung portion and the unsprung portion the internal thread portion is provided. Further, the external thread portion may be configured to be unrotatable while the internal thread portion may be configured to be rotatable. Conversely, the internal thread portion may be configured to be unrotatable while the external thread portion may be configured to be rotatable.

(23) The suspension system according to any one of the forms (1)-(22), comprising a plurality of suspension springs each as the suspension spring and a plurality of electromagnetic actuators each as the actuator, wherein the control device is configured to control the plurality of actuators and the posture-control-component limiting portion is configured such that, when the posture-control component of one of the plurality of actuators is limited, the posture-control component of at least one of the other of the plurality of actuators is limited.

In the above form (23), the suspension spring and the electromagnetic actuator are disposed for each of the plurality of wheels. The control by the "posture-control-component limiting portion" described in the form may be a control in which the posture control component of the actuator corresponding to the front left wheel is limited in an instance where the posture control component is limited in the actuator corresponding to the front right wheel when the control for restraining the pitch of the vehicle body is under execution. Alternatively, the control by the posture-control-component limiting portion may be a control in which the posture control component of the actuator corresponding to the rear right wheel is limited in an instance where the posture control component is limited in the actuator corresponding to the front right wheel when the control for restraining the roll of the vehicle body is under execution. Moreover, the control by the posture-control-component limiting portion may be a control in which, where the posture control component is limited in the actuator corresponding to any one of the four wheels, the posture control component of each of the actuators corresponding to the other three wheels is limited. In this instance, if the posture control component of each of the actuators corresponding to the other three wheels is limited to a value that corresponds to the limited posture control component of the actuator for the above-indicated one wheel, as explained in the following form, it is possible to maintain the distribution of the roll rigidity between the front-wheel side and the rear-wheel side.

In an instance where the posture control component is limited in the actuator corresponding to any one of the front wheels, the roll rigidity on the front-wheel side becomes low and a difference in the load between the front left wheel and the front right wheel upon turning becomes small. That is, the cornering power on the front-wheel side becomes large, thereby reducing the tendency of understeer. Accordingly, when the posture control component in the actuator corresponding to any one of the front wheels is limited, it is desirable that the posture control component in the actuator corresponding to at least one of the rear wheels be limited for maintaining the roll rigidity distribution.

(24) The suspension system according to the form (23), wherein the posture-control-component limiting portion is configured such that the posture-control component of each of the at least one of the other of the plurality of actuators is limited to a value that corresponds to the posture-control component of said one of the plurality of actuators which has been limited.

The above form (24) may employ an arrangement in which the limit values of the left and right wheels are made the same, an arrangement in which a ratio of the limit value of the front wheel to the limit value of the rear wheel is set at a specific value, and an arrangement in which those two arrangements are integrated. Where the third arrangement is employed, the roll rigidity distribution can be easily maintained. According to the form, even when the posture control component in the actuator that corresponds to any one of the four wheels is limited, the posture control components of the actuators that respectively correspond to the other three wheels are automatically controlled, making it possible to maintain an appropriate body posture.

EMBODIMENTS

There will be explained in detail some embodiments of the claimable invention with reference to the drawings. It is to be understood, however, that the claimable invention is not limited to the following embodiments but may be embodied with various changes and modifications, such as those described in the FORMS OF THE INVENTION, which may occur to those skilled in the art.

First Embodiment i) Structure of Suspension System

Figure 1:
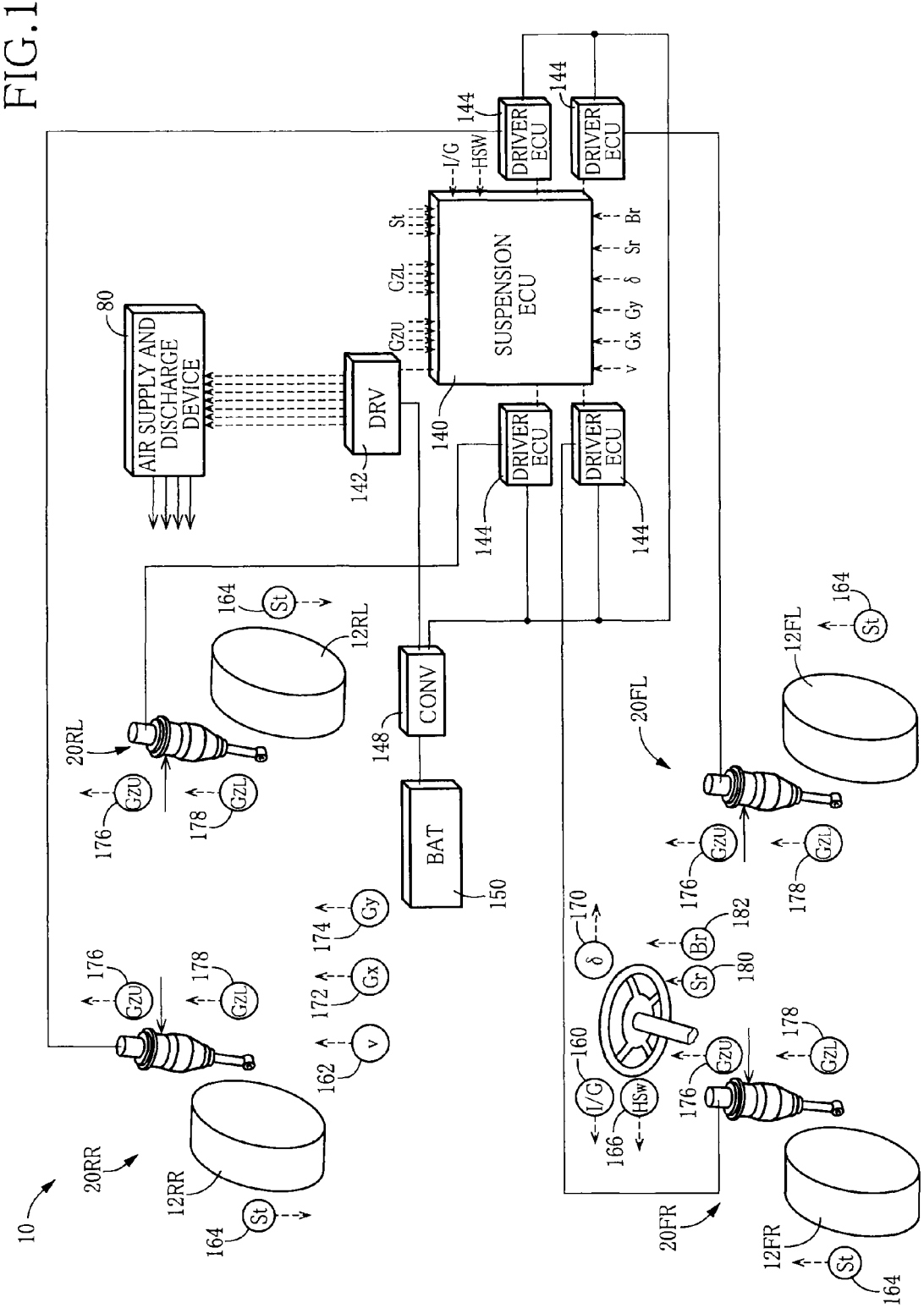
FIG. 1 is a schematic view illustrating an overall structure of a suspension system for a vehicle according to a first embodiment.

FIG. 1 schematically shows a suspension system 10 for a vehicle according to a first embodiment. The suspension system 10 includes four independent suspension apparatus which respectively correspond to four wheels 12, namely, a front left wheel, a front right wheel, a rear left wheel, and a rear right wheel. Each of the suspension apparatus includes a spring•absorber Assy 20 in which a suspension spring and a shock absorber are united. The four wheels 12 and the four spring•absorber Assys 20 are collectively referred to as the wheel 12 and the spring•absorber Assy 20, respectively. Where it is necessary to distinguish the four wheels 12 from each other and to distinguish the four spring•absorber Assys 20 from each other, there are attached suffixes "FL", "FR", "RL", and "RR" respectively indicating the front left wheel, the front right wheel, the rear left wheel, and the rear right wheel.

Figure 2:
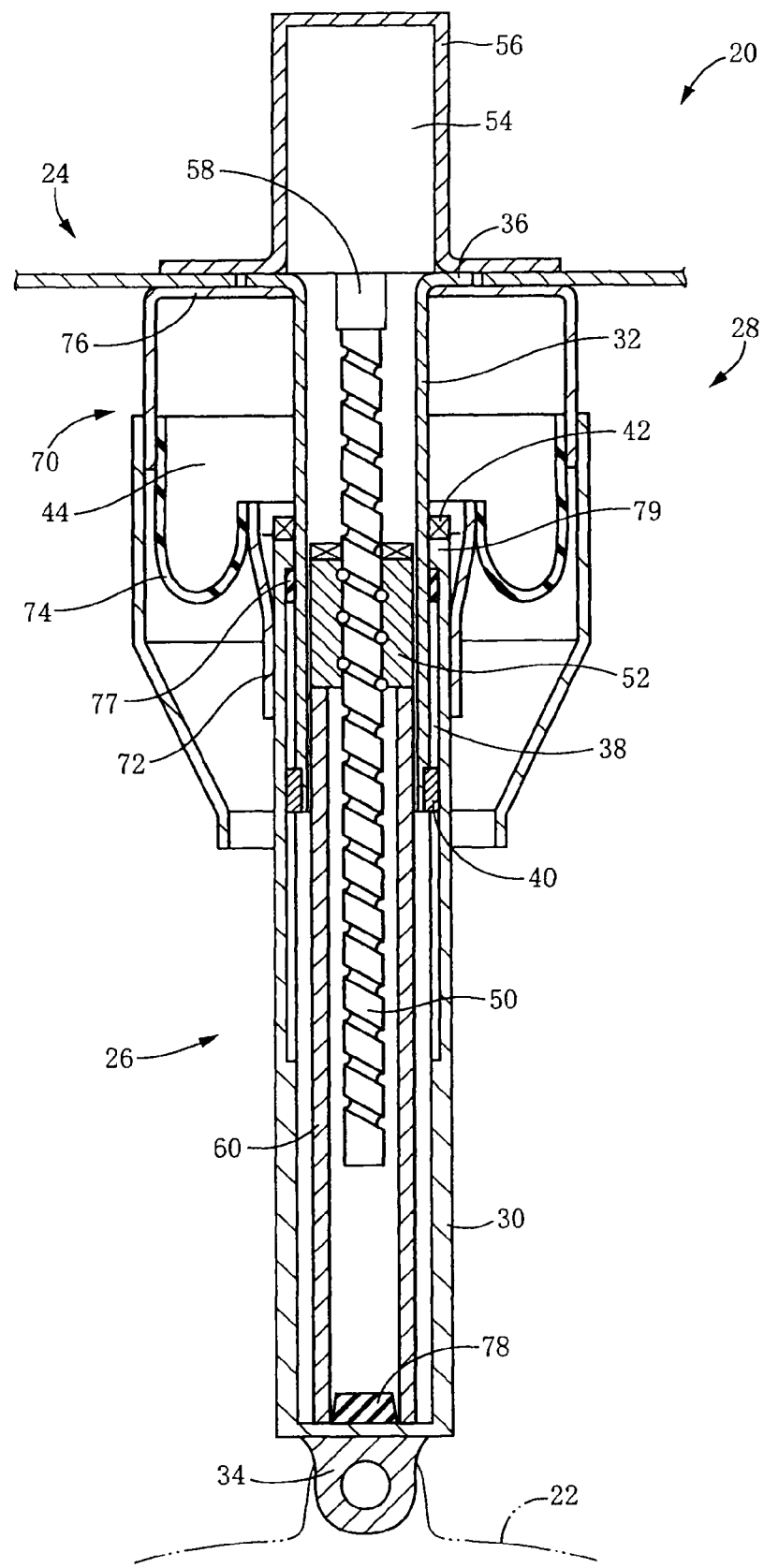
FIG. 2 is a front elevational view in cross section illustrating a spring•absorber Assy shown in FIG. 1.

As shown in FIG. 2, the spring•absorber Assy 20 includes: an actuator 26 disposed between a suspension lower arm 22 as an unsprung portion for holding the wheel 12 and a mount portion 24 as a sprung portion provided on a body of the vehicle, so as to interconnect the suspension lower arm 22 and the mount portion 24; and an air spring 28 as a suspension spring disposed in parallel with the actuator 26.

The actuator 26 includes an outer tube 30 and an inner tube 32 which is inserted into the outer tube 30 so as to protrude upward from an upper end portion of the outer tube 30. The outer tube 30 is connected to the lower arm 22 via a connecting member 34 provided at its lower end while the inner tube 32 is connected at a flange portion 36 formed on an upper end thereof, to the mount portion 24. The outer tube 30 is formed with, on its inner wall surface, a pair of guide grooves 38 that extend in a direction in which an axis of the actuator 26 extends (hereinafter referred to as "axis direction" where appropriate). Into the pair of guide grooves 38, a pair of keys 40 provided at a lower end portion of the inner tube 32 are fitted. Owing to the guide grooves 38 and the keys 40 fitted therein, the outer tube 30 and the inner tube 32 are made unrotatable relative to each other and movable relative to each other in the axis direction. A seal 42 is attached to the outer end portion of the outer tube 30 for preventing air leakage from a pressure chamber 44 described below.

The actuator 26 includes a ball screw mechanism and an electric motor 54 as a power source (hereinafter simply referred to as "motor 54" where appropriate). The ball screw mechanism includes a threaded rod 50, as an external thread portion, in which a thread groove is formed, and a nut 52, as an internal thread portion, which holds bearing balls and which is screwed with the threaded rod 50. The motor 54 is a three-phase brushless motor and is fixedly accommodated in a motor casing 56. A flange portion of the motor casing 56 is fixed to an upper surface of the mount portion 24 while the flange portion 36 of the inner tube 32 is fixed to the flange portion of the motor casing 56, whereby the inner tube 32 is connected to the mount portion 24 via the motor casing 56. A motor shaft 58 which is a rotation shaft of the motor 54 is connected integrally to an upper end of the threaded rod 50. That is, the threaded rod 50 is disposed in the inner tube 32 so as to continuously extend from the motor shaft 58 and is rotated by the motor 54. The nut 52 is fixed to and supported by an upper end portion of a nut supporting member 60 that is attached to an inner bottom portion of the outer tube 30 while being screwed with the threaded rod 50.

The air spring 28 includes a housing 70 fixed to the mount portion 24, an air piston 72 fixed to the outer tube 30 of the actuator 26, and a diaphragm 74 that interconnects the housing 70 and the air piston 72. The housing 70 is a generally cylindrical member having a cap portion 76. The housing 70 is fixed at an upper surface of the cap portion 76 thereof to a lower surface of the mount portion 24, such that the inner tube 32 of the actuator 26 passes through a hole formed in the cap portion 76. The air piston 72 has a generally cylindrical shape and is fixed to an upper portion of the outer tube 30 such that the outer tube 30 is inserted thereinto. The housing 70 and the air piston 72 are connected to each other via the diaphragm 74 so as to maintain air tightness in the housing 70 and the air piston 72, whereby the pressure chamber 44 is formed by the housing 70, the air piston 72, and the diaphragm 74. The pressure chamber 44 is filled with compressed air as a fluid. In the structure described above, the air spring 28 elastically supports the lower arm 22 and the mount portion 24 relative to each other, namely, elastically supports the vehicle wheel 12 and the vehicle body relative to each other, by the pressure of the compressed air.

In the structure described above, when the sprung portion and the unsprung portion move toward and away from each other, the outer tube 30 and the inner tube 32 can be moved relative to each other in the axis direction. In accordance with the relative movement of the outer and inner tubes 30, 32, the threaded rod 50 and the nut 52 are moved relative to each other in the axis direction while the threaded rod 50 rotates relative to the nut 52. The motor 54 is configured to give a rotational torque to the threaded rod 50 and to generate, owing to the rotational torque, a resistance force against the movement of the sprung portion and the unsprung portion toward and away from each other, to stop the movement. The resistance force is utilized as a damping force with respect to the movement of the sprung portion and the unsprung portion toward and away from each other, whereby the actuator 26 functions as the so-called absorber (damper). In other words, the actuator 26 has a function of giving a damping force with respect to the relative movement of the sprung portion and the unsprung portion owing to an actuator force thereof generated in the axis direction. The actuator 26 also has a function of utilizing the actuator force as a propulsive force or a drive force with respect to the relative movement of the sprung portion and the unsprung portion. According to the function, it is possible to execute a skyhook control in which the damping force proportional to an absolute speed of the sprung portion (sprung absolute speed) is applied with respect to the relative movement of the sprung portion and the unsprung portion. Further, the actuator 26 has a function of positively changing a distance between the sprung portion and the unsprung portion in a vertical direction (hereinafter referred to as "sprung-unsprung distance" where appropriate) and maintaining the sprung-unsprung distance at a suitable distance, by the actuator force. Owing to the function, it is possible to effectively restrain or suppress roll of the vehicle body upon turning and pitch of the vehicle body upon acceleration and deceleration and to adjust the height of the vehicle.

The suspension system 10 has a fluid inflow and outflow device for permitting air as a fluid to flow into and flow out of the air spring 28 of each spring•absorber Assy 20, more particularly, an air supply and discharge device 80 that is connected to the pressure chamber 44 of each air spring 28 for supplying the air into the pressure chamber 44 and discharging the air from the same 44. While a detailed explanation of the air supply and discharge device 80 is dispensed with, the air amount in the pressure chamber 44 of each air spring 28 can be adjusted by the air supply and discharge device 80 in the thus constructed suspension system 10. By adjusting the air amount, a spring length of each air spring 28 can be changed and the sprung-unsprung distance for each wheel 12 is thereby changed. More specifically, the air amount in the pressure chamber 44 is increased for thereby increasing the sprung-unsprung distance while the air amount in the pressure chamber 44 is decreased for thereby decreasing the sprung-unsprung distance.

In the suspension system 10, the spring•absorber Assy 20 is operated by a suspension electronic control unit 140 (hereinafter referred to as "suspension ECU 140" where appropriate), namely, the actuator 26 and the air spring 28 are controlled by the suspension ECU 140. The suspension ECU 140 is constituted principally by a computer equipped with a CPU, a ROM, a RAM, etc. To the suspension ECU 140, there are connected: a driver 142 as a drive circuit for the air supply and discharge device 80; and motor driver electronic control units 144 provided so as to correspond to the respective motors 54 of the actuators 26. Each motor driver electronic control unit 144 is hereinafter referred to as "driver ECU 144" where appropriate. Each driver ECU 144 includes an inverter 146 as a drive circuit for the corresponding motor 54 and is configured to control the motor 54 by controlling the inverter 146. The driver 142 and the inverters 146 are connected to a battery 150 via a converter 148. An electric power is supplied from an electric power source constituted by including the converter 148 and the battery 150 to control valves, a pump motor and the like, of the air supply and discharge device 80, and the motors 54 of the respective actuators 26. Each motor 54 is driven at a constant voltage. Accordingly, the amount of electric power to be supplied to the motor 54 is changed by changing the amount of electric current to be supplied thereto, and the force of the motor 54 depends on the amount of the electric current supplied thereto (the supply current amount).

The vehicle is provided with: an ignition switch [I/G] 160; a vehicle-speed sensor [v] 162 for detecting a running speed of the vehicle (hereinafter referred to as "vehicle speed" where appropriate); four stroke sensors [St] 164 respectively for detecting the sprung-unsprung distances for the respective wheels 12; a vehicle-height change switch [HSw] 166 operated by a vehicle driver for sending directions to change a vehicle height; an operation-angle sensor [δ] 170 for detecting an operation angle of a steering wheel; a longitudinal-acceleration sensor [Gx] 172 for detecting actual longitudinal acceleration generated actually in the vehicle body; a lateral-acceleration sensor [Gy] 174 for detecting actual lateral acceleration generated actually in the vehicle body; four vertical-acceleration sensors [$Gz_U$] 176 respectively for detecting vertical acceleration of the mount portions 24 of the vehicle body corresponding to the respective wheels 12; four vertical-acceleration sensors [$Gz_L$] 178 respectively for detecting vertical acceleration of the respective wheels 12; a throttle sensor [Sr] 180 for detecting an opening of an accelerator throttle; and a brake-pressure sensor [Br] 182 for detecting a master cylinder pressure of a brake system. These sensors and switches are connected to the computer of the suspension ECU 140. The suspension ECU 140 is configured to control the operation of each spring•absorber Assy 20 based on signals sent from these sensors and switches. The symbol in each square bracket is used in the drawings to indicate the corresponding sensor or switch. In the ROM of the computer of the suspension ECU 140, there are stored programs relating to the control of the actuators 26 that will be explained, various data and so on.

ii) Construction of Driver ECU Etc.

Figure 3:
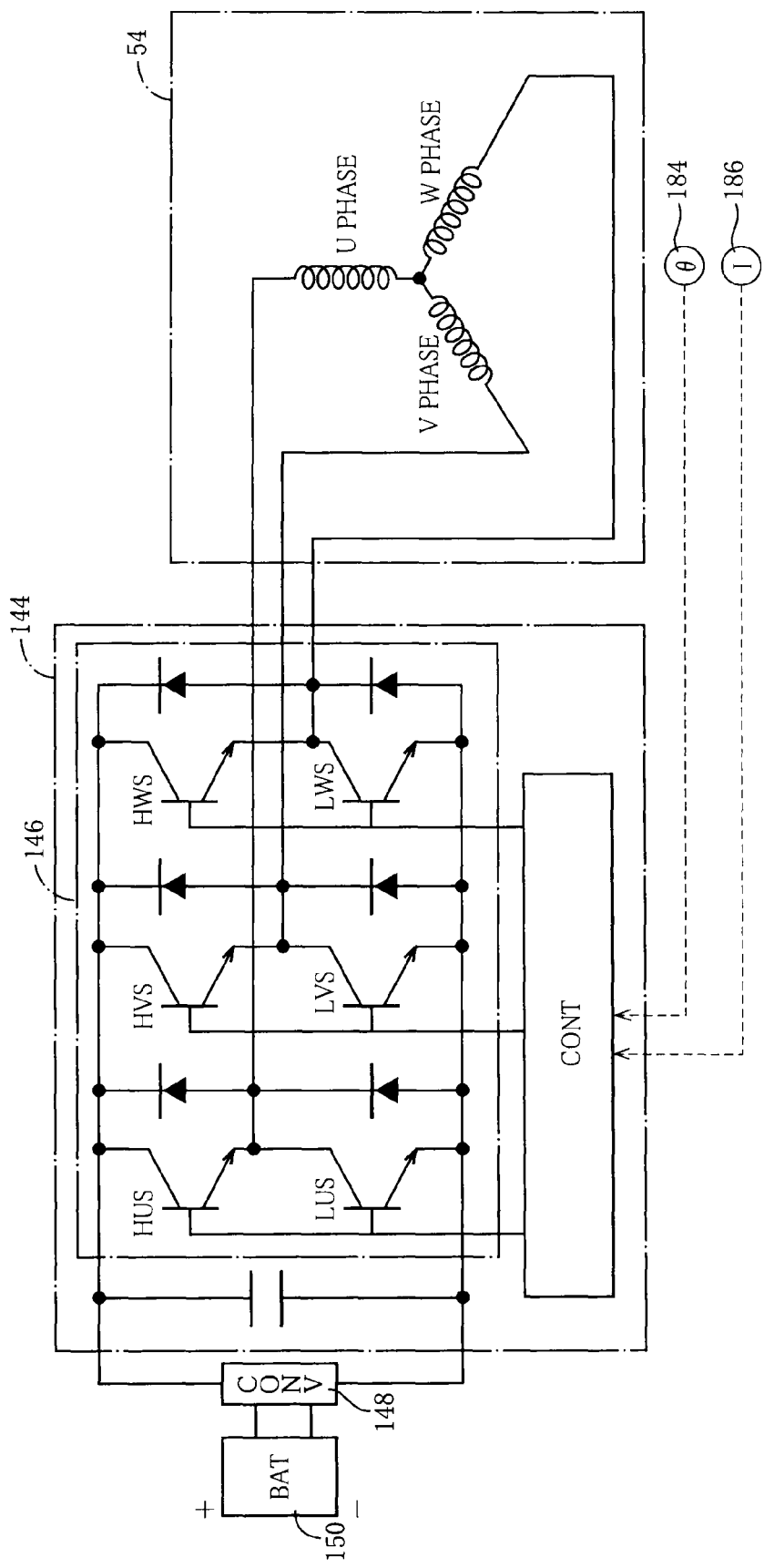
FIG. 3 is a circuitry diagram of an inverter for driving an electric motor of an actuator shown in FIG. 2.

As shown in FIG. 3, the motor 54 of each actuator 26 is a three-phase brushless DC motor in which coils are star-connected (γ-connected), and is driven by being controlled by the corresponding driver ECU 144 as described above. The inverter 146 of each driver ECU 144 has a known, ordinary structure as shown in FIG. 3 and includes high-side (high-voltage side) switching elements and low-side (low-voltage side) switching elements for respective three phases U, V, W of the motor 54, namely, six switching elements HUS, HVS, HWS, LUS, LVS, LWS. To each driver ECU 144, there are connected: a resolver [θ] 184 as an operational-position sensor for detecting an operational angle of the corresponding motor 54; and an electrifying-current sensor [I] 186 for measuring an actual electrifying current amount that is an amount of a current which actually flows in the corresponding motor 54. The resolver 184 and the electrifying-current sensor 186 are provided on each of the motors 54. The driver ECU 144 is configured to judge a motor rotational angle (an electric angle) by the corresponding resolver 184 and control the switching elements to be opened and closed based on the motor rotational angle. The driver ECU 144 drives the motor 54 in the so-called sine-wave drive mode. More specifically, the inverter 146 is controlled such that an amount of an electric current flowing in each of the three phases of the motor 54 changes in a sinusoidal waveform and the phases differ from each other by the electric angle of 120°. The driver ECU 144 electrifies the motor 54 according to a pulse width modulation (PWM) control in which a duty ratio, i.e., a ratio of a pulse-on time to a pulse-off time, is changed, thereby changing the amount of the electric current passing through the motor 54 (i.e., the electrifying current amount) and accordingly changing the magnitude of the rotational torque generated by the motor 54. In more detail, the duty ratio is made large, whereby the electrifying current amount of the motor 54 is made large and the rotational torque generated by the motor 54 is accordingly made large. On the contrary, the duty ratio is made small, whereby the electrifying current amount of the motor 54 is made small and the rotational torque generated by the motor 54 is accordingly made small.

The direction of the rotational torque generated by the motor 54 is the same as a direction in which the motor 54 actually rotates or contrary to the direction. When the direction of the rotational torque generated by the motor 54 is contrary to the rotational direction of the motor 54, namely, when the actuator 26 applies the actuator force as the resistance force against the relative movement of the wheel and the vehicle body, the force generated by the motor 54 does not necessarily depend on the electric power supplied from the electric power source. More particularly, there are instances where an electromotive force is generated in the motor 54 owing to rotation of the motor 54 by an external force and the motor 54 generates the motor force that depends on the electromotive force, namely, there are instances where the actuator 26 generates the actuator force that depends on the electromotive force.

Figure 4:
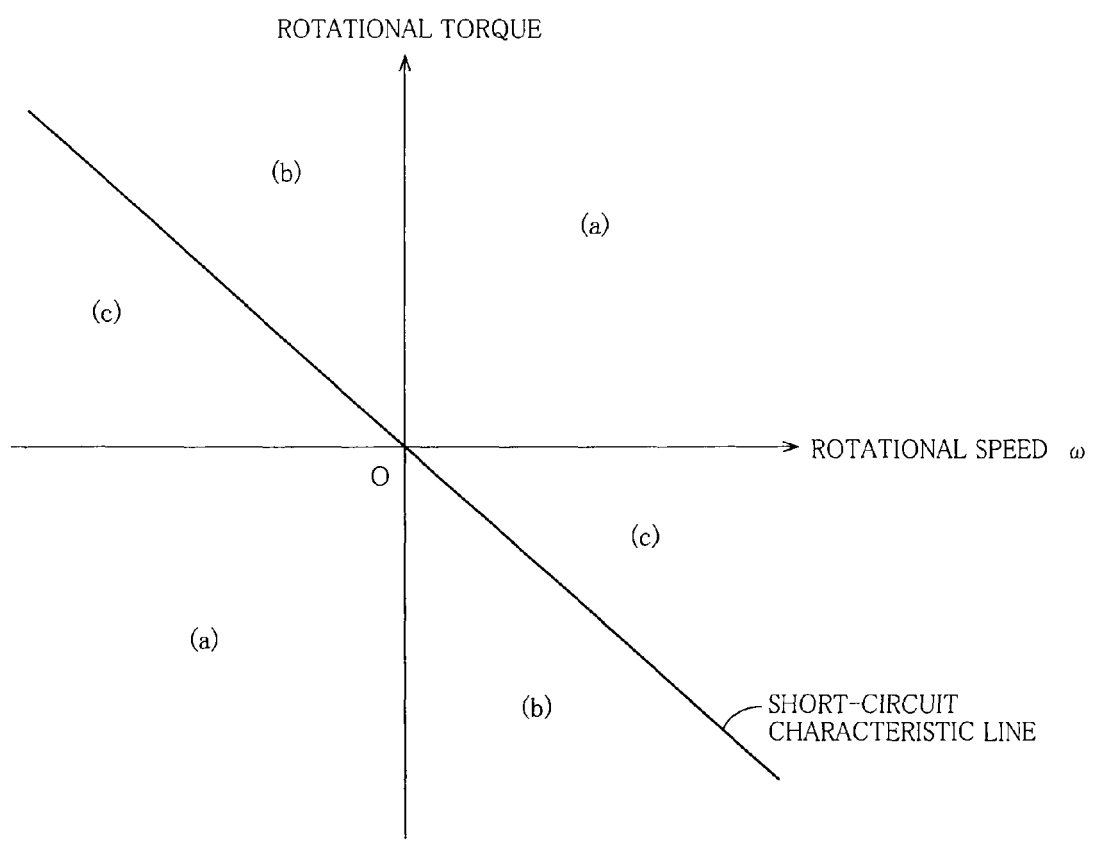
FIG. 4 is a view showing a relationship between rotational speed and rotational torque of the electric motor of the actuator shown in FIG. 2.

FIG. 4 schematically shows a relationship between rotational speed ω of the motor 54 and rotational torque generated by the motor 54. A region (a) in FIG. 4 is a region in which the direction of the rotational torque of the motor 54 is the same as the rotational direction of the motor 54. Each of a region (b) and a region (c) in FIG. 4 is a region in which the direction of the rotational torque of the motor 54 is contrary to the rotational direction of the motor 54. The line which defines the regions (b) and (c) is a characteristic line in an instance where the electrifying terminals of the respective phases of the motor 54 are short-circuited, namely, a short-circuit characteristic line indicating a relationship between rotational speed ω of the motor 54 and rotational torque generated by the motor 54 obtained upon a short-circuit braking operation of the motor 54. In the region (c) in which the rotational torque generated by the motor 54 with respect to the rotational speed ω is smaller than the rotational torque at the short-circuit characteristic line, the motor 54 functions as an electricity generator and generates the rotational torque working as the resistance force that depends on the electromotive force. The region (b) is a region in which the motor 54 generates, by the electric power supplied from the battery 150, the torque working as the resistance force, namely, the so-called reverse braking region. The region (a) is a region in which the motor 54 generates, by the electric power supplied from the battery 150, the torque working as the drive force.

The inverter 146 is configured such that the electric power generated by the electromotive force can be regenerated into the battery 150. That is, the relationship between the rotational speed ω of the motor 54 and the rotational torque generated by the motor 54 coincides with the relationship in the above-indicated region (c), the generated electric power that depends on the electromotive force is regenerated. In an instance where the direction of the rotational torque generated by the motor 54 is contrary to the rotational direction of the motor 54, the above-described PWM control of the switching elements is arranged to control the electric current amount passing through each of the coils of the motor 54 by the electromotive force, and the magnitude of the rotational torque generated by the motor 54 is changed by changing the duty ratio. That is, the inverter 146 is configured to control the motor force by controlling the electric current passing through each coil of the motor 54, namely, by controlling the electrifying current of the motor 54, irrespective of whether the electric current is supplied from the electric power source or generated by the electromotive force.

iii) Basic Control in Suspension System

In the present suspension system 10, the four spring•absorber Assys 20 can be controlled independently of each other. In the four spring•absorber Assys 20, the actuator force of the actuator 26 is independently controlled, whereby there are executed: a control for damping vibrations of the vehicle body and the wheel 12, namely, the sprung vibration and the unsprung vibration (hereinafter referred to as "vibration damping control"); and a control for controlling the posture of the vehicle body (hereinafter referred to as "body-posture control") in which are integrated (a) a control for restraining roll of the vehicle body (hereinafter referred to as "roll restrain control") and (b) a control for restraining pitch of the vehicle body (hereinafter referred to as "pitch restrain control"). In the above-indicated vibration damping control and body-posture control, a target actuator force is determined by summing a vibration damping component and a body-posture component each as a component of the actuator force in the corresponding control. The actuator 26 is controlled so as to generate the target actuator force, whereby the vibration damping control and the body-posture control are executed simultaneously. In the following explanation, the actuator force and its component are positive values when corresponding to a force in a direction (i.e., a rebound direction) in which the sprung portion and the unsprung portion move away from each other and negative values when corresponding to a force in a direction (i.e., a bound direction) in which the sprung portion and the unsprung portion move toward each other.

In the present suspension system 10, there is executed a control for changing, by the air springs 28, the vehicle height based on an intension of the driver in an attempt to deal with running on a bad road, for instance. The control is hereinafter referred to as "height changing control" where appropriate. The height changing control will be briefly explained. The height changing control is executed when a target height which is one of predetermined heights to be realized is changed by an operation of the vehicle-height change switch 166 based on the intention of the driver. For each of the predetermined heights, a target sprung-unsprung distance for each of the four wheels 12 is set in advance. The operation of the air supply and discharge device 80 is controlled such that the sprung-unsprung distances for the respective wheels 12 become equal to the respective target distances, based on the values detected by the respective stroke sensors 164, whereby the sprung-unsprung distances for the respective wheels 12 are suitably changed in accordance with the target height. In the height changing control, there is also executed, for instance, the so-called "auto leveling" for coping with a change in the vehicle height due to a change in the number of passengers riding on the vehicle, a change in the weight of cargos carried by the vehicle, and the like.

A) Vibration Damping Control

In the vibration damping control, a vibration damping component $F_V$ of the actuator force is determined to generate the actuator force having a magnitude corresponding to the speed of the vibration of the vehicle body and the wheel 12 to be damped. More specifically, the vibration damping component $F_V$ is calculated according to the following formula on the basis of (1) a displacement speed of the mount portion 24 in the vertical direction calculated based on the vertical acceleration that is detected by the vertical acceleration sensor 176 disposed on the mount portion 24, i.e., the so-called sprung speed $V_U$ and (2) a displacement speed of the wheel 12 in the vertical direction calculated based on the vertical acceleration that is detected by the vertical acceleration sensor 178 disposed on the lower arm 22, i.e., the so-called unsprung speed $V_L$:

$$F_V = C_U \cdot V_U - C_L \cdot V_L$$

In the above formula, $C_U$ is a gain for generating a damping force in accordance with the displacement speed of the mount portion 24 in the vertical direction and $C_L$ is a gain for generating a damping force in accordance with the displacement speed of the wheel 12 in the vertical direction. That is, the gains $C_U$, $C_L$ may be considered damping coefficients with respect to the so-called sprung absolute vibration and unsprung absolute vibration, respectively. The vibration damping component $F_V$ may be determined otherwise. For instance, for executing a control to generate a damping force based on a relative displacement speed of the sprung portion and the unsprung portion (i.e., a sprung-unsprung relative displacement speed), the vibration damping component $F_V$ may be determined, according to the following formula, based on a rotational speed ω of the motor 54 that is obtained, as a value indicative of the relative displacement speed of the sprung portion and the unsprung portion, from a value detected by the resolver 184 disposed on the motor 54:

$$F_V = C \cdot \omega \quad (C: \text{damping coefficient})$$

B) Body-Posture Control

The body-posture control is for restraining the roll of the vehicle body that arises from turning of the vehicle and the pitch of the vehicle body that arises from acceleration and deceleration of the vehicle. In more detail, the body-posture control is a control in which are integrated: the roll restrain control for generating the actuator force in accordance with roll moment that acts on the vehicle body arising from turning of the vehicle; and the pitch restrain control for generating the actuator force in accordance with pitch moment that acts on the vehicle body arising from acceleration and deceleration of the vehicle. That is, a posture control component $F_S$ of the actuator force is a sum of a roll restrain component $F_R$ and a pitch restrain component $F_P$.

$$F_S = F_R + F_P$$

There will be hereinafter explained the roll restrain control and the pitch restrain control focusing on methods for respectively determining the roll restrain component $F_R$ and the pitch restrain component $F_P$.

a) Roll Restrain Control

Upon turning of the vehicle, the sprung portion and the unsprung portion located on the inner side with respect to the turning are moved away from each other while the sprung portion and the unsprung portion located on the outer side with respect to the turning are moved toward each other, due to the roll moment that arises from the turning. In the roll restrain control, the actuator 26 located on the inner side with respect to the turning is controlled to generate, as the roll restrain force, the actuator force in the bound direction while the actuator 26 located on the outer side with respect to the turning is controlled to generate, as the roll restrain force, the actuator force in the rebound direction, for restraining the relative movement of the sprung portion and the unsprung portion, located on the inner side with respect to the turning, away from each other and for restraining the relative movement of the sprung portion and the unsprung portion, located on the outer side with respect to the turning, toward each other. More specifically, control-use lateral acceleration Gy* to be used in the control is determined as lateral acceleration indicative of the roll moment that the vehicle body receives, according to the following formula, on the basis of (1) estimated lateral acceleration Gyc that is estimated based on the operation angle δ of the steering wheel and the vehicle speed v and (2) actual lateral acceleration Gyr that is actually measured by the lateral-acceleration sensor 174:

$$Gy^* = K_1 \cdot Gyc + K_2 \cdot Gyr \ (K_1, K_2: \text{gains})$$

The roll restrain component $F_R$ is determined based on the thus determined control-use lateral acceleration Gy*, according to the following formula:

$$F_R = K_3 \cdot Gy^* \ (K_3: \text{gain})$$

b) Pitch Restrain Control

When the vehicle body nose-dives upon braking, the sprung portions and the unsprung portions located on the front-wheel side of the vehicle are moved toward each other while the sprung portions and the unsprung portions located on the rear-wheel side of the vehicle are moved away from each other, due to pitch moment that causes the nose dive. When the vehicle body squats upon acceleration or the like, the sprung portions and the unsprung portions located on the front-wheel side of the vehicle are moved away from each other while the sprung portions and the unsprung portions located on the rear-wheel side of the vehicle are moved toward each other, due to pitch moment that causes the squat. In the pitch restrain control, the actuator force is generated as a pitch restrain force in an attempt to restrain a distance by which the sprung portion and the unsprung portion are moved away from each other or a distance by which the sprung portion and the unsprung portion are moved toward each other, upon the nose dive and the squat. More specifically, actual longitudinal acceleration Gx that is actually measured by the longitudinal-acceleration sensor 172 is used as longitudinal acceleration indicative of pitch moment that the vehicle body receives. On the basis of the actual longitudinal acceleration Gx, the pitch restrain component $F_P$ is determined according to the following formula:

$$F_P = K_4 \cdot Gx \ (K_4: \text{gain})$$

The pitch restrain control is executed when the throttle opening detected by the throttle sensor 180 exceeds a prescribed threshold or the master cylinder pressure detected by the brake-pressure sensor 182 exceeds a prescribed threshold.

C) Target Actuator Force and Control of Operation of Motor

The control of each actuator 26 is executed based on the target actuator force that is an actuator force to be generated by the actuator 26. In more detail, after the vibration damping component $F_V$ and the posture control component $F_S$ of the actuator force have been determined as described above, the target actuator force F* is determined based on those components $F_V$, $F_S$ according to the following formula:

$$F^* = F_V + F_S$$

On the basis of the thus determined target actuator force F*, a target duty ratio is determined and a command based on the determined duty ratio is sent to the corresponding driver ECU 144. The driver ECU 144 controls the corresponding inverter 146 under the suitable duty ratio and drives the corresponding motor 54 so as generate the target actuator force. While not explained in detail, a feedback control of the electrifying current amount that flows in the motor 54 is executed in the driver ECU 144, such that a difference between a target electrifying current amount in accordance with a command value from the suspension ECU 140 and an actual electrifying current amount detected by the electrifying-current sensor 186 provided on the motor 54 becomes equal to zero.

iv) Posture-Control-Component Limiting Control

Figure 5:
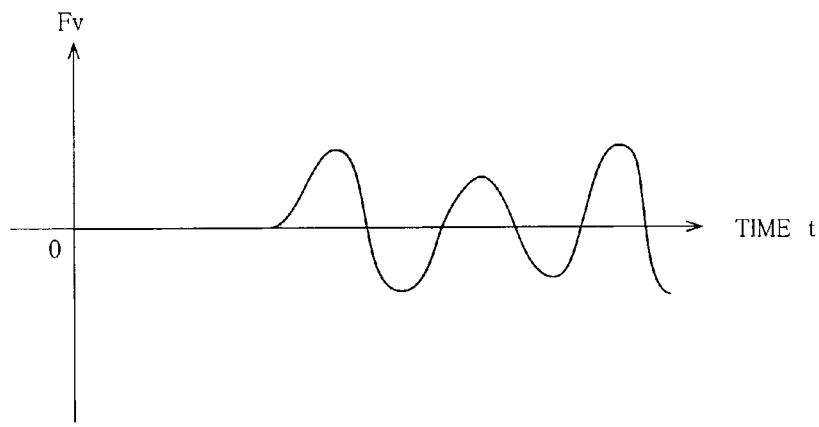
FIGS. 5(a)-(c) are views respectively showing a change in a vibration damping component, a change in a posture control component, and a change in a target actuator force as a component sum.
Figure 5:
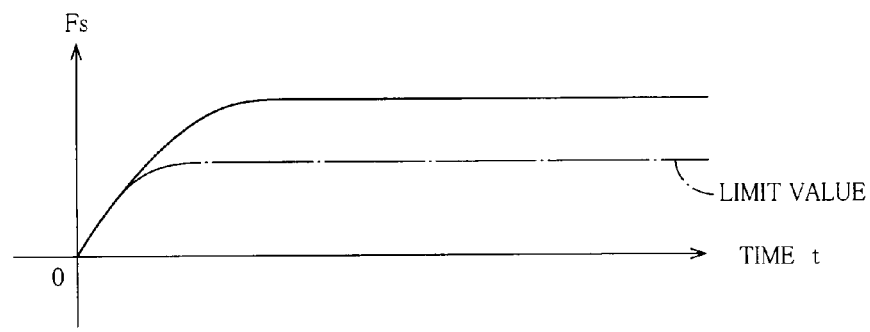
Figure 5:
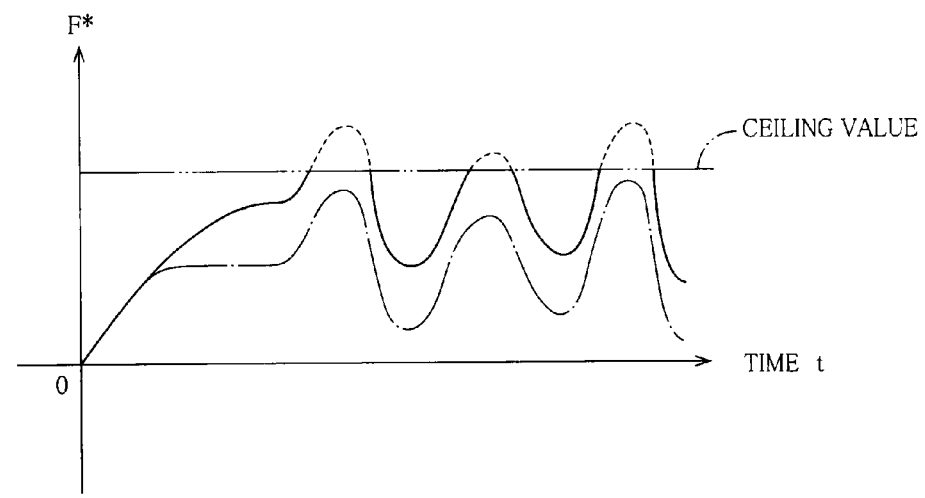

In an instance where the above-described controls are executed, each of the actuators 26 for the respective wheels 12 generates the actuator force when running on a left-curved road with unevenness, for damping the vibration of the vehicle and restraining the roll of the vehicle body. In this case, both of the vibration damping component $F_V$ and the posture control component $F_S$ become large, so that the actuator force F* that should be generated may undesirably exceed a ceiling value that can be generated by the actuator 26. FIGS. 5(a)-5(c) respectively show the vibration damping component $F_V$, the posture control component $F_S$, and the target actuator force F* as a sum of those components, generated in such a case in the actuator 26FR corresponding to the front right wheel 12FR. As indicated by the solid line in FIG. 5(c), the actuator force that should be generated becomes insufficient. In view of this, a posture-control-component limiting control for limiting the posture control component $F_S$ to a value not larger than a limit value is executable in the present suspension system 10, for giving a higher priority to the vibration damping control over the body-posture control, namely, so as not to give, to the vibration damping control, an influence due to the insufficient actuator force.

Figure 6:
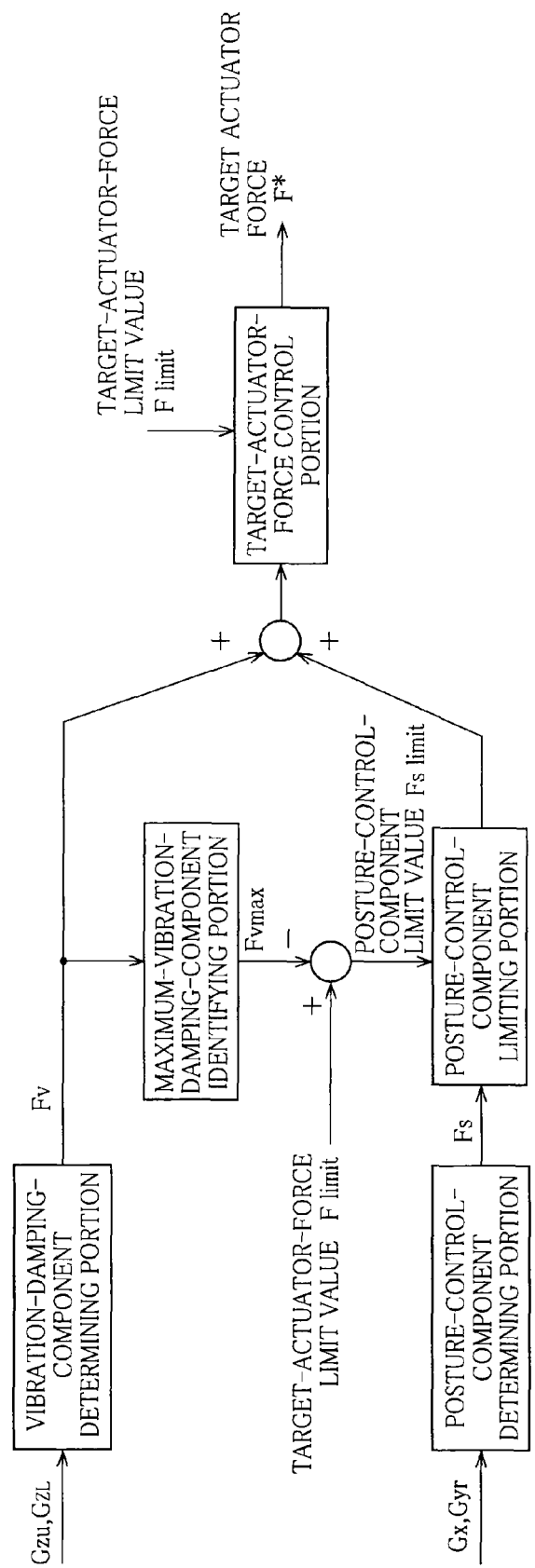
FIG. 6 is a view schematically showing a flow of a posture-control-component limiting control.

FIG. 6 is a view schematically showing a flow of the posture-control-component limiting control. In the posture-control-component limiting control, after the vibration damping component $F_V$ and the posture control component $F_S$ have been determined as explained above, there is initially identified a maximum vibration damping component $F_{Vmax}$ which is a maximum value of the vibration damping component $F_V$ within a prescribed preceding time (e.g., 1 second) counted from the present time point. It is noted that a target actuator-force limit value $F_{limit}$ which is a limit value of the actuator force and which is generated by the actuator 26 is determined to be equal to a value slightly smaller than a ceiling value of the motor force that can be generated by the motor 54, on the basis of the ceiling value, so as not to place an excessive load on the motor 54. Subsequently, a posture-control-component limit value $F_{Slimit}$ is determined according to the following formula so as to have a magnitude that enables the maximum vibration damping component $F_{Vmax}$ to be generated:

$$F_{Slimit} = F_{limit} - F_{Vmax}$$

Where the posture control component $F_S$ which has been determined is larger than the thus determined posture-control-component limit value $F_{Slimit}$, the posture control component $F_S$ is made equal to the determined posture-control-component limit value $F_{Slimit}$. While the target actuator force $F^*$ is obtained by adding the posture control component $F_S$ and the vibration damping component $F_V$, the target actuator force $F^*$ is limited to a value not larger than the target-actuator-force limit value $F_{limit}$ so as not to place an excessive load on the motor 54.

As explained above, in the posture-control-component limiting control, the posture-control-component limit value $F_{Slimit}$ is determined based on the maximum vibration damping component $F_{Vmax}$ within the prescribed time. In other words, the posture-control-component limiting control is arranged such that the posture-control-component limit value is changeable based on the vibration damping component that should be generated. Further, the posture-control-component limit value is determined using the actuator force value. Since the actuator force value is proportional to the electrifying current amount that is an amount of the current flowing through the motor 54, it can be said that the posture-control-component limit value is determined based on the electrifying current amount. In the suspension ECU 140, there is executed a control in which the target actuator force $F^*$ is limited to a value not larger than the limit value, namely, a control in which a component sum that is a sum of the vibration damping component and the posture control component is limited to a value not larger than a component-sum limit value that is a limit value of the component sum.

Where the posture control component $F_S$ for one actuator 26 that corresponds to one of the four wheels 12 is limited as described above, the other three actuators 26 that correspond to the other three wheels 12 are controlled to limit the posture control components thereof. In this instance, each of the posture control components of the respective actuators 26 that correspond to the other three wheels 12 is limited to a value corresponding to the limit value in the above-indicated one actuator 26 in which the posture control component has been limited. To be more specific, the posture-control-component limit values of the respective actuators 26 corresponding to the other three wheels 12 are determined so as to maintain a preset roll rigidity distribution between the front-wheel side and the rear-wheel side. In more detail, the posture-control-component limit values of the respective actuators 26 corresponding to the left and right wheels 12 are made equal to each other while the posture-control-component limit values of the respective actuators 26 corresponding to the front and rear wheels 12 are determined to be equal to respective values that satisfy a ratio in accordance with the roll rigidity distribution. According to the arrangement, it is possible to prevent a reduction in the tendency of understeer, which is caused when only the posture control component of any one of the front wheels is limited.

v) Control Flow of Actuator

Figure 7:
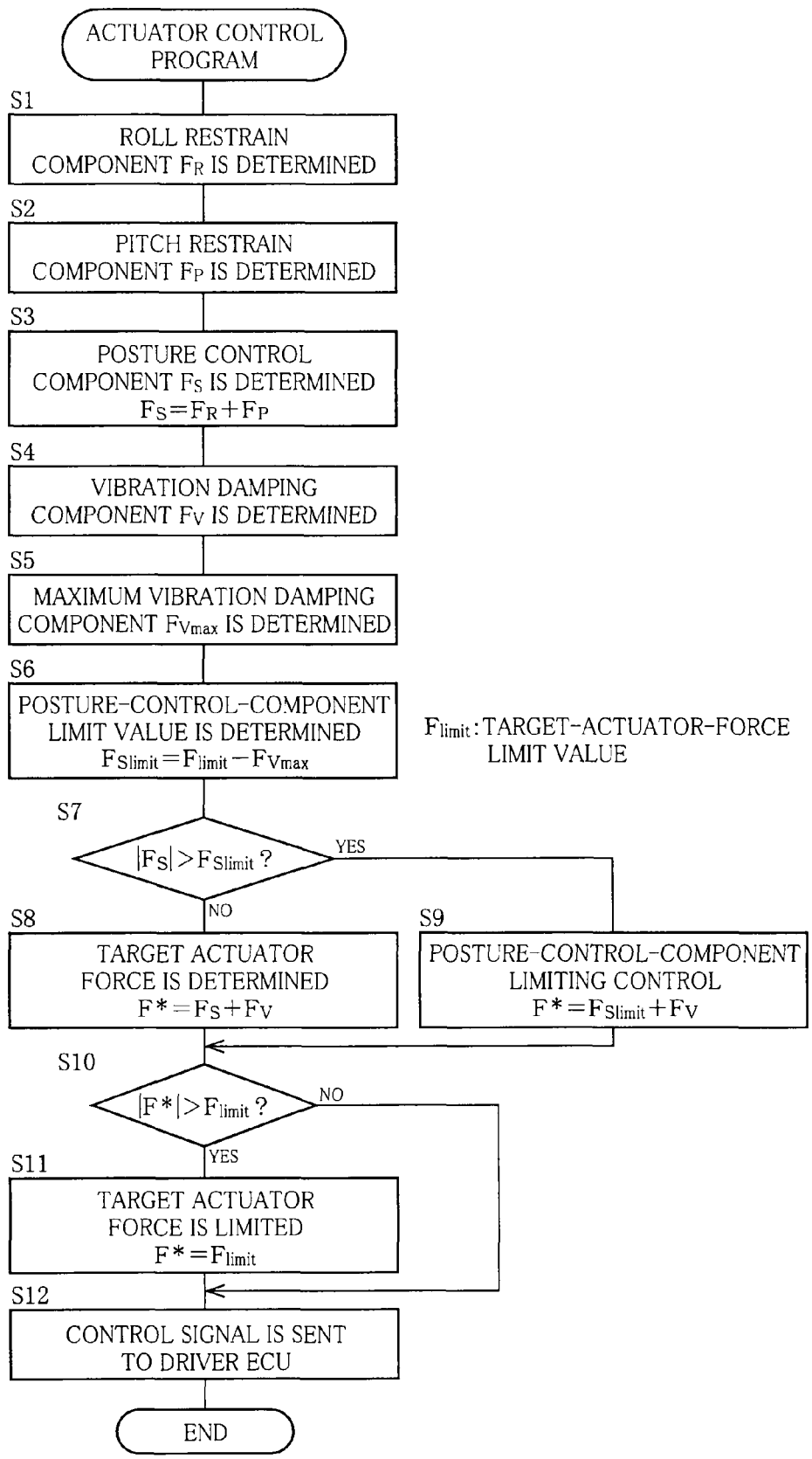
FIG. 7 is a flow chart showing an actuator control program executed by a suspension electronic control unit shown in FIG. 1.

The control of the actuator 26 explained above is executed such that an actuator control program indicated by a flow chart of FIG. 7 is repeatedly implemented by the suspension ECU 140 at short time intervals, e.g., from several milliseconds to several tens of milliseconds, with an ignition switch 160 of the vehicle placed in an ON state. Hereinafter, there will be briefly explained the flow of the control referring to the flow chart. The actuator control program is executed for each of the four actuators 26 of the respective spring•absorber Assys 20 provided on the respective four wheels 12. In the following description, there will be explained processing by the program executed on one of four actuators 26, for the interest of brevity.

In the actuator control program, the posture control component $F_S$ and the vibration damping component $F_V$ are initially determined as explained above in step S1 (hereinafter "step" is omitted where appropriate) through S4. Next, S5 is implemented to identify the maximum vibration damping component $F_{Vmax}$ within a prescribed preceding time counted from the present time point and S6 is implemented to determine the posture-control-component limit value $F_{Slimit}$ on the basis of the maximum vibration damping component $F_{Vmax}$ and the target-actuator-force limit value $F_{limit}$. Subsequently, it is judged in S7 whether or not the posture control component $F_S$ is larger than the posture-control-component limit value $F_{Slimit}$. Where the posture control component $F_S$ is larger than the posture-control-component limit value $F_{Slimit}$, the control flow goes to S9 in which the posture control component $F_S$ is made equal to the limit value $F_{Slimit}$ and the actuator force $F^*$ is determined. In S10, it is judged whether or not the target actuator force $F^*$ determined in S8 or S9 is larger than the target-actuator-force limit value $F_{limit}$. Where it is judged that the target actuator force $F^*$ is larger than the target-actuator-force limit value $F_{limit}$, the target actuator force $F^*$ is made equal to the target-actuator-force limit value $F_{limit}$ in S11. The duty ratio is determined based on the thus determined target actuator force $F^*$, and the control signal in accordance with the duty ratio is sent to the driver ECU 144. Thus, one execution of the actuator control program is ended after a series of processing described above.

vi) Functional Structure of Control Device

Figure 8:
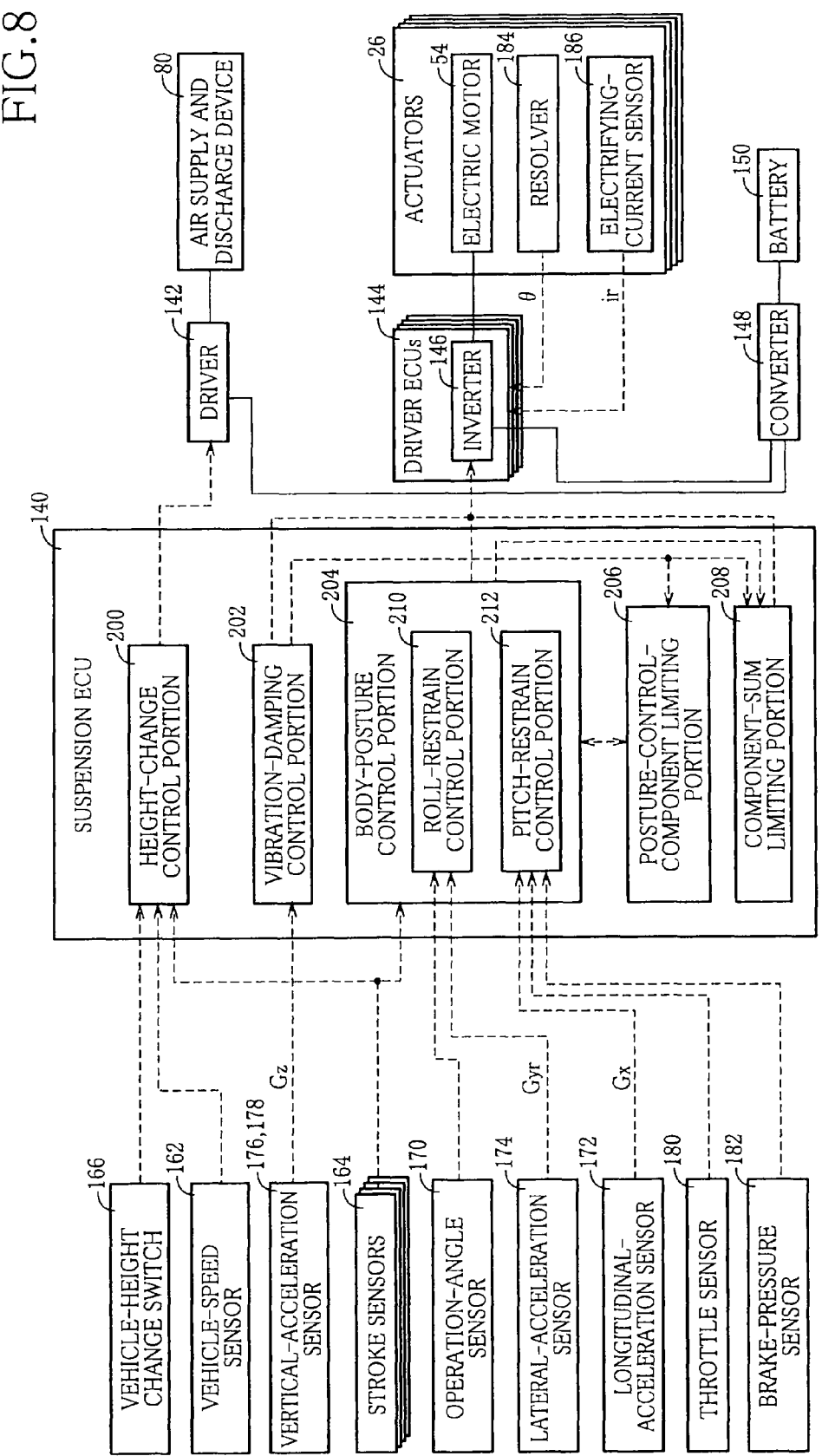
FIG. 8 is a block diagram showing functions of the suspension electronic control unit shown in FIG. 1.

FIG. 8 is a functional block diagram schematically showing the function of the above-described suspension ECU 140. According to the function described above, the suspension ECU 140 includes: a height-change control portion 200 for performing the vehicle height change by the air springs 28; a vibration-damping control portion 202 for determining the vibration damping component $F_V$ of the actuator force to be generated by each actuator 26; a body-posture control portion 204 for controlling the posture of the vehicle body to restrain roll moment and pitch moment that act on the vehicle body; a posture-control-component limiting portion 206 for performing the posture-control-component limiting control; and a component-sum limiting portion 208 for limiting the component sum which is a sum of the vibration damping component and the posture control component, to a value not larger than the limit value. The body-posture control portion 204 includes a roll-restrain control portion 210 for determining the roll restrain component $F_R$ and a pitch-restrain control portion 212 for determining the pitch restrain component $F_P$. It is noted that, in the suspension ECU 140 of the present suspension system 10, the posture-control-component limiting portion 206 is constituted by including a portion that executes the processing in S5-S7 and S9 of the actuator control program and that the component-sum limiting portion 208 is constituted by including a portion that executes the processing in S10 and S11 of the actuator control program.

Second Embodiment

A suspension system for a vehicle according to a second embodiment is identical in hardware structure with the system in the illustrated first embodiment. In the following explanation, therefore, the same reference numerals as used in the first embodiment are used to identify the corresponding components having the same function as in the first embodiment, and a detailed explanation of which is dispensed with. The system of the second embodiment differs from the system of the first embodiment in the control by the suspension ECU. Accordingly, the control by the suspension ECU according to the present embodiment will be hereinafter explained.

Figure 9:
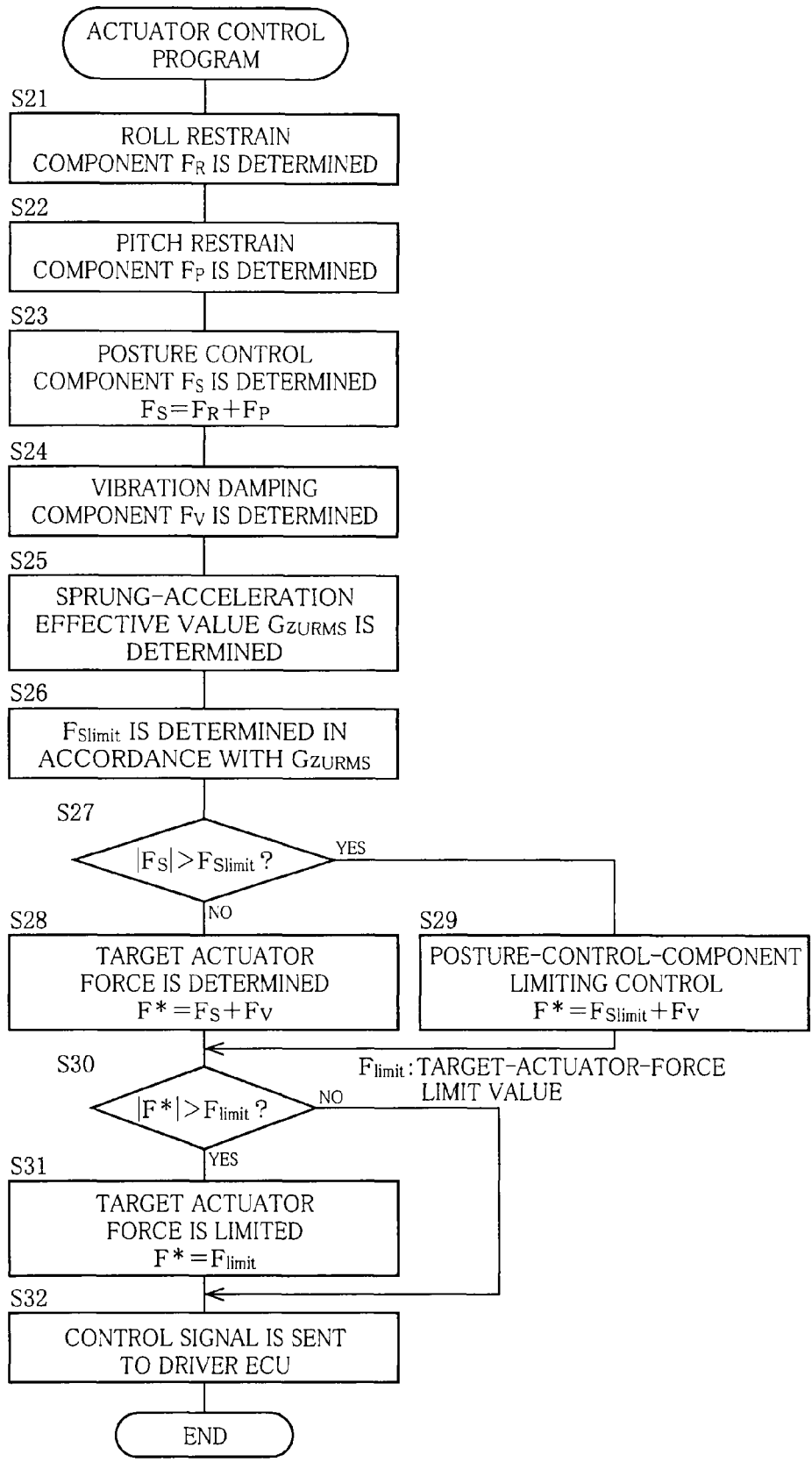
FIG. 9 is a flow chart showing an actuator control program executed in a suspension system according to a second embodiment.
Figure 10:
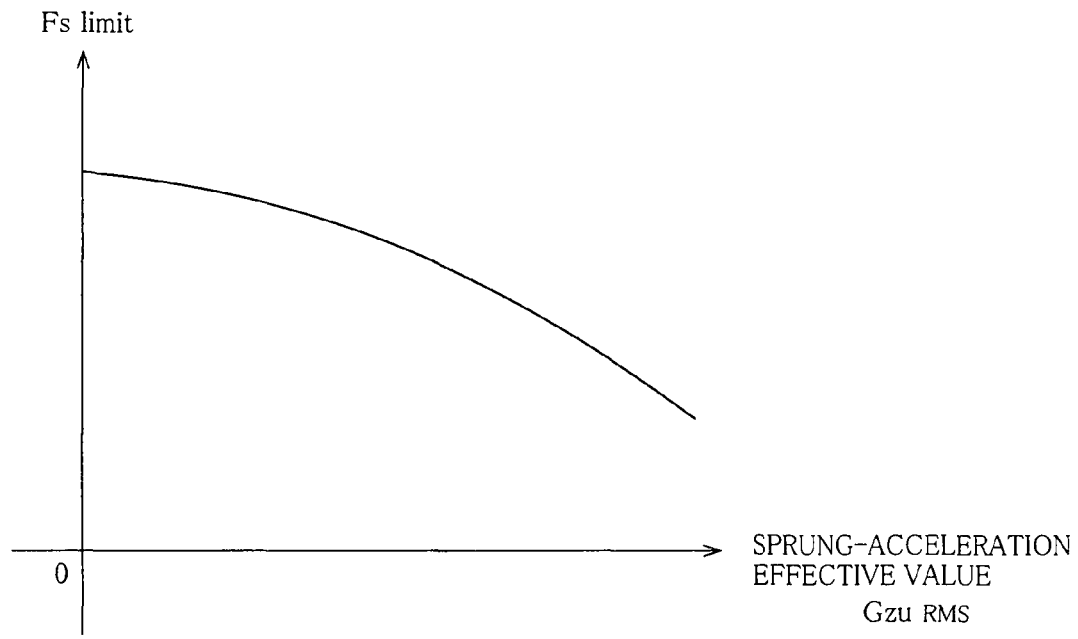
FIG. 10 is a view showing a relationship between sprung-acceleration effective value and posture-control-component limit value.

In the suspension system according to the second embodiment, the posture-control-component limiting control in the suspension ECU 140 is arranged to change the posture-control-component limit value based on an intensity of a vibration of the sprung portion (i.e., a sprung vibration). The intensity of the sprung vibration is judged based on the vertical acceleration detected by the vertical-acceleration sensor 176 provided on each mount portion 24 of the vehicle body, namely, the so-called sprung acceleration $Gz_U$. The posture-control-component limit value is determined in an actuator control program indicated by a flow chart of FIG. 9, in place of the actuator control program of FIG. 7 in the illustrated first embodiment. More specifically, there is calculated in S25 an effective value $Gz_{URMS}$ (an RMS value, a root-mean-square value) of the sprung acceleration within the prescribed preceding time counted from the present time point, and the posture-control-component limit value $F_{Slimit}$ is determined in accordance with the sprung-acceleration effective value $Gz_{URMS}$. More specifically, there is stored, in the ROM of the suspension ECU 140, map data (FIG. 10) of posture-control-component limit value using sprung-acceleration effective value as a parameter. The posture-control-component limit value $F_{Slimit}$ is determined in S26 referring to the map data. As shown in FIG. 10, the posture-control-component limit value $F_{Slimit}$ is made smaller with an increase in the sprung-acceleration effective value $Gz_{URMS}$. In short, the posture-control-component limiting control is arranged such that the posture-control-component limit value becomes smaller in an instance where the intensity of the sprung vibration is high, as compared with an instance where the intensity of the sprung vibration is low.

Subsequently, it is judged whether or not the posture control component $F_S$ which has been determined is larger than the posture-control-component limit value $F_{Slimit}$. Where the posture control component $F_S$ is larger than the posture-control-component limit value $F_{Slimit}$, the posture control component $F_S$ is made equal to the limit value $F_{Slimit}$, and the target actuator force $F^*$ is determined in S29. In the system of the present embodiment, the target actuator force $F^*$ is arranged to be limited to a value not larger than the target-actuator-force limit value $F_{limit}$ that is a limit value of the target actuator force $F^*$, for preventing the motor 54 from receiving an excessive load. The target actuator force $F^*$ determined in S28 or S29 is judged in S30 to be larger or not than the target-actuator-force limit value $F_{limit}$. Where the target actuator force $F^*$ is judged to be larger than the target-actuator-force limit value $F_{limit}$, the target actuator force $F^*$ is made equal to the target-actuator-force limit value $F_{limit}$ in S31. The duty ratio is determined based on the thus determined target actuator force $F^*$, and the control signal in accordance with the duty ratio is sent to the driver ECU 144. Thus, one execution of the actuator control program is ended after a series of processing described above.

Like the suspension ECU 140 of the suspension system in the illustrated first embodiment, the suspension ECU 140 of the suspension system in the second embodiment has the posture-control-component limiting portion. Accordingly, it is possible to ensure a sufficient amount of the actuator force required to be generated in the vibration damping control with respect to the actuator force that can be generated. Therefore, a sufficient amount of the damping force can be generated, thereby preventing a deterioration in the riding comfort of the vehicle and a deterioration in the stability of the vehicle. Since the posture-control-component limit value is set using the actuator force value as in the first embodiment, it can be said the posture-control-component limit value is set based on the electrifying current amount. It is noted that the posture-control-component limit value may be changed based on not only the intensity of the sprung vibration, but also an intensity of a vibration of the unsprung portion (i.e., an unsprung vibration).

Third Embodiment

A suspension system for a vehicle according to a third embodiment is also identical in hardware structure with the system in the illustrated first embodiment. In the following explanation, therefore, the same reference numerals as used in the first embodiment are used to identify the corresponding components having the same function as in the first embodiment, and a detailed explanation of which is dispensed with. The system of the third embodiment differs from the system of the first embodiment in the control by the suspension ECU. Accordingly, the control by the suspension ECU according to the present embodiment will be hereinafter explained.

While the actuator force is utilized in the control of the actuator 26 in the suspension system in the first embodiment, the electrifying current amount which is a related amount of the actuator force indicative of the magnitude of the actuator force is utilized in the third embodiment. Accordingly, the vibration damping control and the body-posture control are simultaneously executed such that a vibration damping component $i_V$ and a posture control component $i_S$ each as a component of the electrifying current amount of the motor 54 in the corresponding control are summed up for thereby determining a target electrifying current amount $i^*$ ($=i_V+i_S$) and such that the actuator 26 is controlled to generate the actuator force in accordance with the target electrifying current amount $i^*$.

i) Vibration Damping Control

In the vibration damping control, a vibration damping component $i_V$ of the electrifying current amount is determined to generate the actuator force having a magnitude corresponding to the speed of the vibration of the vehicle body and the wheel 12 to be damped. To be more specific, the vibration damping component $i_V$ is calculated determined according to the following formula on the basis of (1) the sprung speed $V_U$ detected and calculated by the vertical-acceleration sensor 176 disposed on the mount portion 24 of the vehicle body and (2) the unsprung speed $V_L$ detected and calculated by the vertical-acceleration sensor 178 disposed on the lower arm 22:

$$i_V = K_V \cdot (C_U \cdot V_U - C_L \cdot V_L) \ (K_V: \text{gain})$$

ii) Body-Posture Control

In the body-posture control, a posture control component $i_s$ of the electrifying current amount is determined according to the following formula on the basis of: the roll restrain component $F_R$ that is the actuator force in accordance with the roll moment which acts on the vehicle body arising from turning of the vehicle; and the pitch restrain component $F_P$ that is the actuator force in accordance with the pitch moment which acts on the vehicle body arising from acceleration and deceleration of the vehicle:

$$i_s = K_S \cdot (F_R + F_P) \ (K_S: \text{gain})$$

The roll restrain component $F_R$ and the pitch restrain component $F_P$ are determined in a manner similar to that in the first embodiment.

iii) Determination of Target Electrifying Current and Control of Operation of Motor On the basis of the thus determined vibration damping component $i_V$ and posture control component $i_s$ each as the component of the target electrifying current amount, an electrifying current amount i* as a target (i.e., a target electrifying current amount) is determined according to the following formula:

$$i^* = i_s + i_V$$

Subsequently, a target duty ratio is determined based on the thus determined target electrifying current amount i*, and a command based on the determined duty ratio is sent to the driver ECU 144. The driver ECU 144 controls the inverter 146 under the suitable duty ratio, thereby driving the motor 54 so as to generate the motor force in accordance with the target electrifying current amount i*. By the motor 54 being thus driven, the actuator 26 generates the actuator force in accordance with the target electrifying current amount i*.

iv) Body-Posture-Control-Component Limiting Control

In the body-posture control, the amount of change in the distance between the sprung portion and the unsprung portion is small and a speed of the change is low. That is, it can be considered that substantially no electromotive force is generated in the motor 54. Accordingly, the electrifying current amount in an instance where its component is only the posture control component may be considered to be equal to the supply current amount to be supplied to the motor 54 from the battery 150. In the system according to the present embodiment, the posture-control-component limiting control is arranged such that the posture control component $i_s$ as the component of the electrifying current amount is limited to a value not larger than the limit value. Accordingly, the posture-control-component limit value may be considered to be set based on the supply current amount.

Figure 11:
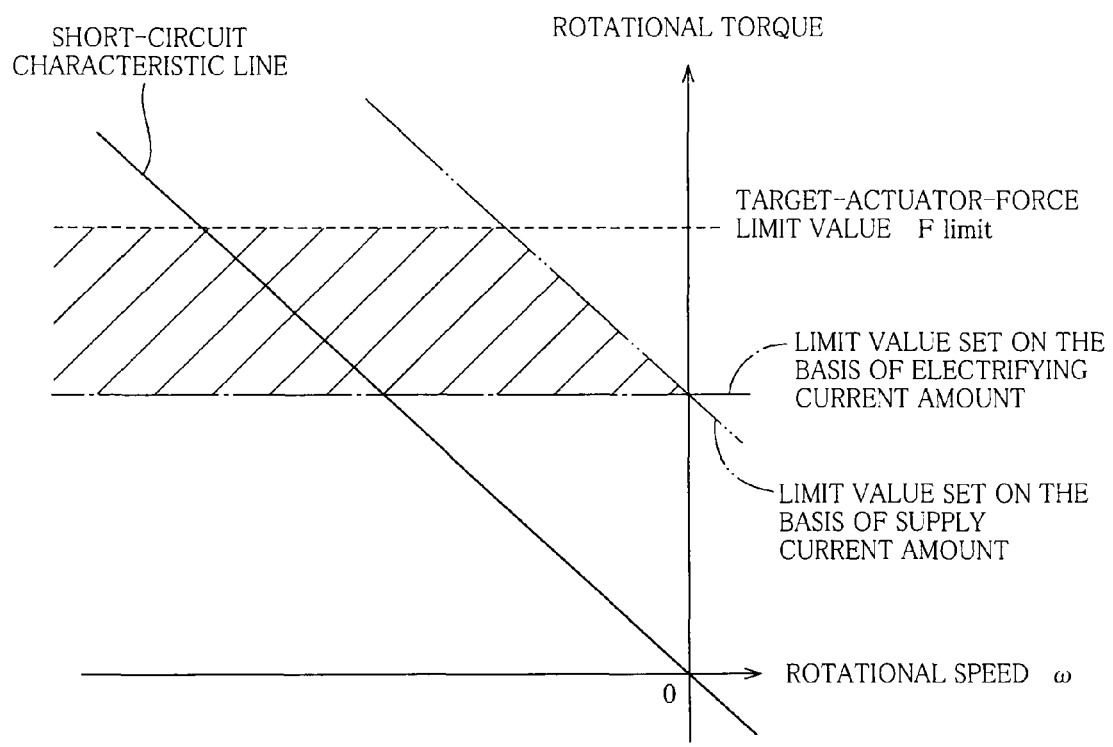
FIG. 11 is a schematic view showing the posture-control-component limit value set based on an electrifying current amount and the posture-control-component limit value set based on a supply current amount.

FIG. 11 is a view schematically showing the posture-control-component limit value set on the basis of the electrifying current amount and the posture-control-component limit value set on the basis of the supply current amount. Since the electrifying current amount is proportional to the motor force, the limit value set on the basis of the electrifying current amount is indicated by the one-dot chain line in FIG. 11. On the other hand, the supply current amount is an amount of the current supplied from the battery 150 in an instance where the motor 54 generates a force exceeding the actuator force in accordance with a current amount that can be generated by the motor 54 (i.e., a generated current amount or a current amount generated when the electrifying terminals of the motor 54 are short-circuited). Accordingly, the limit value set on the basis of the supply current amount is indicated by the two-dot chain line in FIG. 11 that is obtained by shifting the short-circuit characteristic line. In other words, because the posture-control-component limit value is set on the basis of the supply current amount in the present embodiment, it is possible to additionally generate the actuator force in the hatched region in FIG. 11, as compared with the case in which the posture-control-component limit value is set on the basis of the electrifying current amount.

Further, the posture-control-component limiting control is arranged such that the posture-control-component limit value is changed on the basis of an actual supply current amount that is an actual amount of the current supplied from the battery 150 to the motor 54. The actual supply current amount is calculated by subtracting the generated current amount that can be generated by the motor 54 based on the electromotive force, from an actual electrifying current amount that is an amount of the current which actually flows in the motor 54. In calculating the actual supply current amount, the target electrifying current amount i* as the command value to the motor 54 is utilized as the actual electrifying current amount, and the generated current amount is estimated on the basis of the sprung-unsprung distance detected by the stroke sensor 164. To be more specific, the generated current amount is calculated according to the following formula on the basis of the stroke speed $V_{St}$ that is calculated from the sprung-unsprung distance:

$$i_G = K_T \cdot V_{St}/(R \cdot L)$$

In the above formula, $K_T$ is a torque constant, R is an internal resistance value of the motor 54, and L is a lead of the threaded rod 50. Accordingly the actual supply current amount is calculated according to the following formula:

$$i_{SU} = i^* - i_G$$

The generated current amount of the motor 54 may be estimated based on map data of the generated current amount using the stroke speed as a parameter, in the light of nonlinearity of the generated current amount with respect to the stroke speed. In the system according to the present embodiment, since the suspension ECU 140 and the driver ECU 144 are configured such that communication between the suspension ECU 140 and the driver ECU 144 is allowed in only one direction from the former to the latter, the actual supply current amount is estimated on the basis of the target electrifying current amount i* and the sprung-unsprung distance as explained above. However, where the suspension ECU 140 and the driver ECU 144 are configured such that bidirectional communication therebetween is allowed, the actual supply current amount may be estimated on the basis of the results of detection by the resolver 184 and the electrifying-current sensor 186 provided on the motor 54. To be more specific, the actual supply current amount can be calculated according to the following formula on the basis of the rotational speed ω of the motor 54 that is calculated from the detection result of the resolver 184 and the actual electrifying current amount $i_r$ that is the detection result of the electrifying-current sensor 186:

$$i_{SU} = i_r - K_T \cdot \omega/R$$

There will be next explained a manner of changing the posture-control-component limit value based on the actual supply current amount. In an instance where the actuator force to be generated in the vibration damping control is large and the supply current amount is accordingly required also in the vibration damping control, for instance, the supply current amount required as a whole may exceed a ceiling amount, i.e., the supply current amount that can be supplied from the battery 150. In the present embodiment, therefore, the posture-control-component limit value is decreased when the above-indicated actual supply current amount becomes comparatively large. More particularly, a value slightly smaller than the current amount that can be supplied from the battery 150, namely, a value that ensures stable power supply, is set as an upper-limit supply current amount $i_{limit}$, and the posture-control-component limit value $i_{Slimit}$ is decreased by an amount corresponding to δi each time when the actual supply current amount $i_{SU}$ exceeds the upper-limit supply current amount $i_{limit}$. It is noted that the posture-control-component limit value $i_{Slimit}$ which has been decreased returns back to a preset value after a situation in which the vibration damping component $i_V$ is comparatively small continues for a prescribed time period. In other words, the posture-control-component limiting portion in the present suspension system is configured to make the posture-control-component limit value $i_{Slimit}$ smaller in an instance where the actual supply current amount is large, as compared with an instance where the actual supply current amount is small.

v) Control Flow of Actuator

Figure 12:
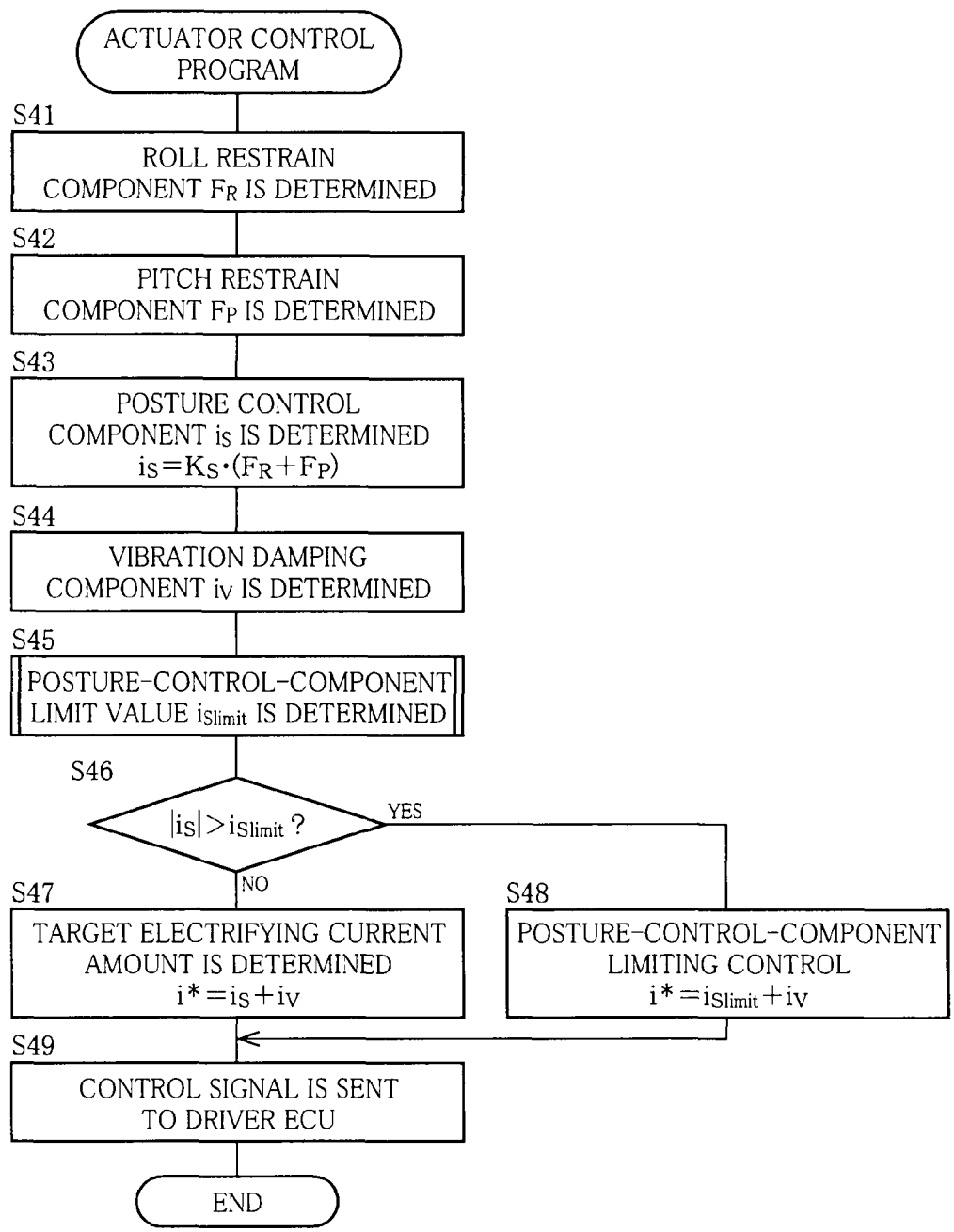
FIG. 12 is a flow chart showing an actuator control program executed in a suspension system according to a third embodiment.
Figure 13:
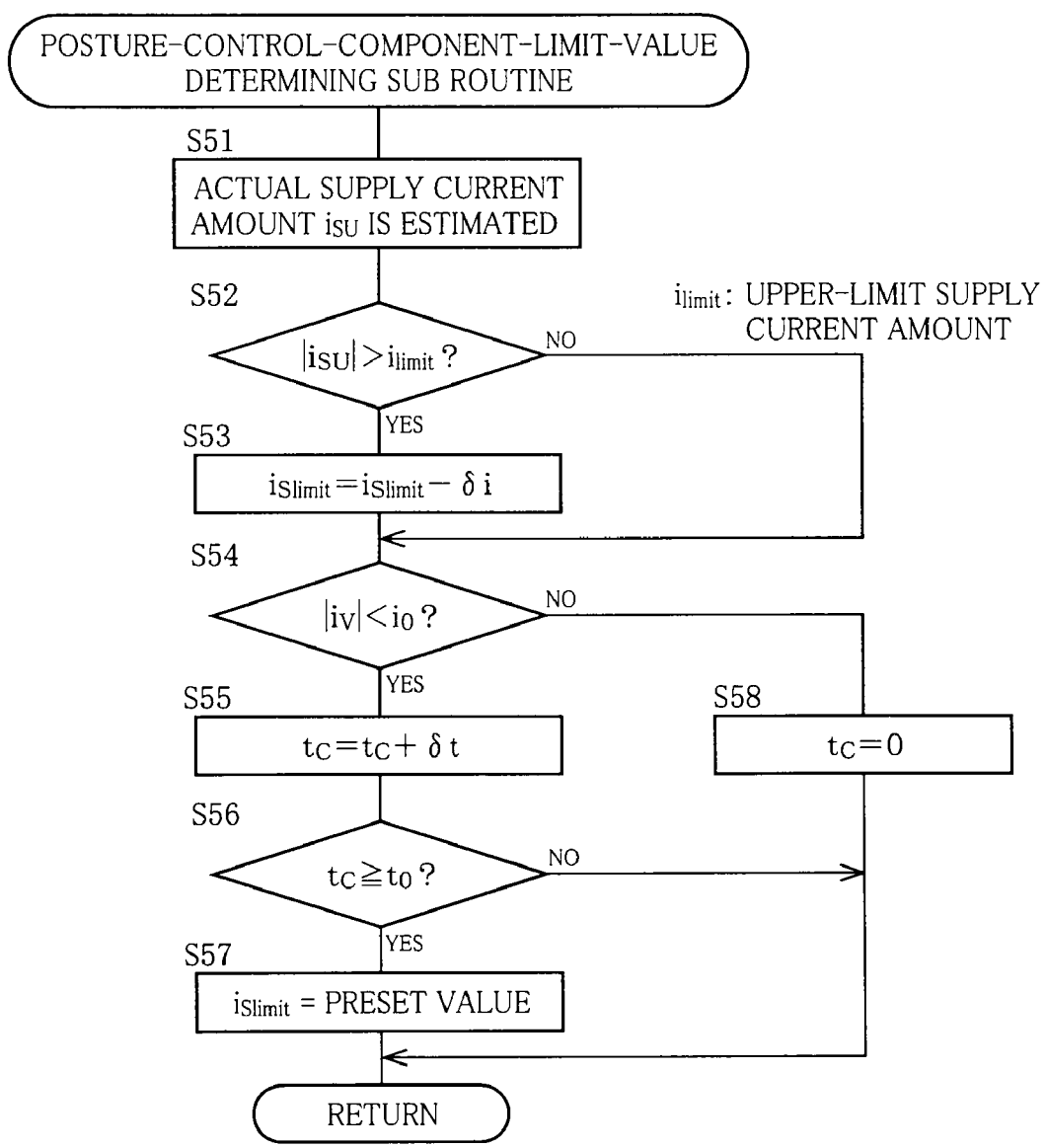
FIG. 13 is a flow chart showing a posture-control-component-limit-value determining subroutine executed in the actuator control program of FIG. 12.

The control of the actuator 26 in the present embodiment is executed such that an actuator control program indicated by a flow chart of FIG. 12 is repeatedly implemented. In the actuator control program, the vibration damping component $i_V$ and the posture control component $i_s$, of the electrifying current amount, are initially determined in S41-S44. Subsequently, in S45, a posture-control-component-limit-value determining sub routine shown in FIG. 13 is implemented to determine the posture-control-component limit value $i_{Slimit}$.

In the posture-control-component-limit-value determining sub routine, S51 is initially implemented to estimate the actual supply current amount $i_{SU}$ on the basis of the target electrifying current i* that is a sum of the vibration damping component $i_V$ and the posture control component $i_s$; and the stroke speed calculated from the detection result of the stroke sensor 164. Next, in S52, the estimated actual supply current $i_{SU}$ is judged to be larger or not than the upper-limit supply current amount $i_{limit}$. Where the actual supply current $i_{SU}$ is larger than the upper-limit supply current amount $i_{limit}$, the posture-control-component limit value $i_{Slimit}$ is decreased by δi. Where it is judged in S54 that the vibration damping component $i_V$ is comparatively small, a time duration $t_C$ of the situation in which the vibration damping component $i_V$ is comparatively small is counted by adding the pitch time δt of the execution of the program. The posture-control-component limit value $i_{Slimit}$ returns back to the preset value in S57 where the time duration $t_C$ exceeds a predetermined time $t_0$.

After the posture-control-component limit value has been determined as described above, it is judged in S46 of the main program whether the posture control component $i_s$ is larger or not than the posture-control-component limit value $i_{Slimit}$. Where the posture control component $i_s$ is larger than the posture-control-component limit value $i_{Slimit}$, the posture control component $i_s$ is made equal to the limit value $i_{Slimit}$, and the target electrifying current amount i* is determined. Thereafter, a duty ratio is determined based on the determined target electrifying current amount i*, and a control signal in accordance with the duty ratio is sent to the driver ECU 144. Thus, one execution of the actuator control program is ended after a series of processing described above.

Like the suspension ECU 140 of the suspension system according to each of the illustrated first and second embodiments, the suspension ECU 140 of the suspension system according to the exemplary third embodiment includes the posture-control-component limiting portion. Accordingly, it is possible to ensure a sufficient amount of the actuator force required to be generated in the vibration damping control with respect to the actuator force that can be generated. Therefore, a sufficient amount of the damping force can be generated, thereby preventing a deterioration in the riding comfort of the vehicle and a deterioration in the stability of the vehicle.

The invention claimed is:

1. A suspension system for a vehicle, comprising:
a suspension spring disposed between a sprung portion and an unsprung portion;
an electromagnetic actuator which is disposed in parallel with the suspension spring and which includes an electric motor, the actuator applying, to the sprung portion and the unsprung portion, an actuator force that is a force in a direction in which the sprung portion and the unsprung portion are moved toward and away from each other, based on a force generated by the electric motor; and
a control device which controls the actuator and which is configured to execute simultaneously (a) a vibration damping control in which the actuator force is generated as a vibration damping force for damping at least a sprung vibration and (b) a body-posture control in which the actuator force is applied as a body-posture control force for restraining at least one of roll and pitch of a body of the vehicle,
wherein the control device is configured to control the actuator force generated by the actuator, based on a component sum which is a sum of (A) a vibration damping component that is the actuator force to be generated in the vibration damping control and (B) a posture control component that is the actuator force to be generated in the body-posture control, and the control device includes a posture-control-component limiting portion configured to limit the posture control component to a value not larger than a posture-control-component limit value that is a limit value of the posture control component.

2. The suspension system according to claim 1, wherein the posture-control-component limit value is set based on an electrifying current amount that is an amount of a current which flows in the electric motor.

3. The suspension system according to claim 1, wherein the posture-control-component limit value is set based on a supply current amount that is an amount of a current which is supplied from an electric power source to the electric motor.

4. The suspension system according to claim 1, wherein the posture-control-component limiting portion is configured to change the posture-control-component limit value.

5. The suspension system according to claim 4, wherein the posture-control-component limiting portion is configured to change the posture-control-component limit value based on the vibration damping component to be generated.

6. The suspension system according to claim 5, wherein the posture-control-component limiting portion is configured to decrease the posture-control-component limit value in an instance where the vibration damping component to be generated is large, as compared with an instance where the vibration damping component to be generated is small.

7. The suspension system according to claim 4, wherein the posture-control-component limiting portion is configured to change the posture-control-component limit value based on an intensity of the sprung vibration.

8. The suspension system according to claim 7, wherein the posture-control-component limiting portion is configured to decrease the posture-control-component limit value in an instance where the intensity of the sprung vibration is high, as compared with an instance where the intensity of the sprung vibration is low.

9. The suspension system according to claim 4, wherein the posture-control-component limiting portion is configured to change the posture-control-component limit value based on an actual supply current amount that is an amount of a current which is actually supplied from an electric power source to the electric motor.

10. The suspension system according to claim 9, wherein the posture-control-component limiting portion is configured to decrease the posture-control-component limit value in an instance where the actual supply current amount is large, as compared with an instance where the actual supply current amount is small.

11. The suspension system according to claim 9,
wherein the actuator is configured such that an operational position of the electric motor corresponds to a position in accordance with a sprung-unsprung distance that is a distance between the sprung portion and the unsprung portion,
wherein the suspension system further comprises an operational-position sensor for detecting the operational position of the electric motor and an electrifying-current sensor for measuring an actual electrifying current amount that is an amount of a current which actually flows in the electric motor, and
wherein the posture-control-component limiting portion is configured to estimate the actual supply current amount based on: a generated current amount of the electric motor estimated based on a result of detection by the operational-position sensor; and the actual electrifying current amount measured by the electrifying-current sensor.

12. The suspension system according to claim 9,
wherein the actuator is configured such that an operational position of the electric motor corresponds to a position in accordance with a sprung-unsprung distance that is a distance between the sprung portion and the unsprung portion,
wherein the suspension system further comprises a sprung-unsprung-distance sensor for measuring the sprung-unsprung distance, and
wherein the posture-control-component limiting portion is configured to estimate, based on the component sum, an actual electrifying current amount that is an amount of a current which actually flows in the electric motor and is configured to estimate the actual supply current amount based on: the estimated actual electrifying current amount; and a generated current amount of the electric motor estimated based on a result of detection by the sprung-unsprung-distance sensor.

13. The suspension system according to claim 1, wherein the control device further includes a component-sum limiting portion configured to limit the component sum to a value not larger than a component-sum limit value that is a limit value of the component sum.

14. The suspension system according to claim 13, wherein the component-sum limit value is set so as to be larger than the posture-control-component limit value.

15. The suspension system according to claim 1, wherein the vibration damping control is for generating the actuator force in accordance with at least a sprung speed.

16. The suspension system according to claim 1, wherein the body-posture control is for restraining at least the roll of the body of the vehicle that arises from turning of the vehicle.

17. The suspension system according to claim 16, wherein the body-posture control is for generating the actuator force in accordance with roll moment that acts on the body of the vehicle arising from turning of the vehicle.

18. The suspension system according to claim 1, wherein the body-posture control is for restraining the pitch of the body of the vehicle arising from acceleration and deceleration of the vehicle.

19. The suspension system according to claim 18, wherein the body-posture control is for generating the actuator force in accordance with pitch moment that acts on the body of the vehicle arising from acceleration and deceleration of the vehicle.

20. The suspension system according to claim 1, further comprising a drive circuit disposed between the electric motor and an electric power source and configured to drive the electric motor while controlling an electrifying current amount that is an amount of a current which flows in the electric motor, by a command from the control device that is based on the component sum.

21. The suspension system according to claim 20, wherein the drive circuit is configured to regenerate at least a part of an electric power generated by the electric motor to an electric power source.

22. The suspension system according to claim 1,
wherein the actuator includes an external thread portion disposed on one of the sprung portion and the unsprung portion and an internal thread portion screwed with the external thread portion and disposed on the other of the sprung portion and the unsprung portion, the external thread portion and the internal thread portion rotating relative to each other in accordance with a movement of the sprung portion and the unsprung portion toward and away from each other, and
wherein the force generated by the electric motor works as a force for rotating the external thread portion and the internal thread portion relative to each other.

23. The suspension system according to claim 1, comprising a plurality of suspension springs each as the suspension spring and a plurality of electromagnetic actuators each as the actuator,
wherein the control device is configured to control the plurality of actuators and the posture-control-component limiting portion is configured such that, when the posture-control component of one of the plurality of actuators is limited, the posture-control component of at least one of the other of the plurality of actuators is limited.

24. The suspension system according to claim 23, wherein the posture-control-component limiting portion is configured such that the posture-control component of each of the at least one of the other of the plurality of actuators is limited to a value that corresponds to the posture-control component of said one of the plurality of actuators which has been limited.

* * * * *